US011122431B2

(12) United States Patent
Pazhyannur et al.

(10) Patent No.: US 11,122,431 B2
(45) Date of Patent: Sep. 14, 2021

(54) INTEGRATING CBRS-ENABLED DEVICES AND INTENT-BASED NETWORKING

(71) Applicant: Cisco Technology, Inc., San Jose, CA (US)

(72) Inventors: Rajesh S. Pazhyannur, Fremont, CA (US); Arun G. Khanna, Sunnyvale, CA (US); Anand Oswal, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/936,562

(22) Filed: Jul. 23, 2020

(65) Prior Publication Data

US 2021/0120408 A1    Apr. 22, 2021

Related U.S. Application Data

(60) Provisional application No. 62/916,783, filed on Oct. 17, 2019, provisional application No. 62/916,725, filed on Oct. 17, 2019.

(51) Int. Cl.
*H04W 12/40* (2021.01)
*H04W 12/06* (2021.01)
*H04L 29/06* (2006.01)
*H04W 48/18* (2009.01)
*H04W 8/18* (2009.01)

(52) U.S. Cl.
CPC .......... *H04W 12/06* (2013.01); *H04L 63/0853* (2013.01); *H04W 8/183* (2013.01); *H04W 12/40* (2021.01); *H04W 48/18* (2013.01)

(58) Field of Classification Search
CPC .......... H04W 8/18; H04W 8/183; H04W 8/26
See application file for complete search history.

(56) References Cited

U.S. PATENT DOCUMENTS

| 10,340,976 | B2 | 7/2019 | Kakinada et al. | |
| 10,484,939 | B2 | 11/2019 | Wong et al. | |
| 10,637,997 | B2 | 4/2020 | Jabara et al. | |
| 10,667,142 | B2 | 5/2020 | Sevindik et al. | |
| 10,813,103 | B1* | 10/2020 | Sevindik | H04W 48/20 |
| 2020/0008138 | A1* | 1/2020 | Sasindran | H04W 4/025 |
| 2020/0213831 | A1* | 7/2020 | Tjandra | H04W 12/08 |

* cited by examiner

*Primary Examiner* — Michael T Vu
(74) *Attorney, Agent, or Firm* — Polsinelli

(57) ABSTRACT

Systems and methods are provided for receiving, at an enterprise network, first authentication data of a citizens broadband radio service (CBRS)-enabled device, receiving, at the enterprise network, second authentication data of the CBRS-enabled device, the first authentication data of the CBRS-enabled device being a different type of authentication data than the second authentication data of the CBRS-enabled device, determining a class of the CBRS-enabled device based on the first authentication data and the second authentication data of the CBRS-enabled device, determining a network segment for the CBRS-enabled device based on the class of the CBRS-enabled device, and providing access to the CBRS-enabled device based on the determining of the network segment for the CBRS-enabled device.

20 Claims, 12 Drawing Sheets

INTEGRATING CBRS-ENABLED DEVICES AND INTENT-BASED NETWORKING

CROSS-REFERENCE TO RELATED APPLICATIONS

This application claims priority to U.S. Provisional Patent Application Nos. 62/916,783 and 62/916,725, both of which were filed on Oct. 17, 2019, the contents of which are incorporated herein by reference in their entirety.

TECHNICAL FIELDS

The subject matter of this disclosure relates in general to the field of computer networking, and more particularly, to systems and methods for integrating Citizens Broadband Radio Service (CBRS) enabled devices into an enterprise network and for integrating policy for heterogeneous wireless networks, such as Wi-Fi networks, mobile or cellular networks, CBRS networks, and other radio networks.

BACKGROUND

An enterprise network (sometimes also referred to as a Local Area Network (LAN), an access network, a campus network, etc.) can provide connectivity to computing devices (e.g., servers, workstations, desktop computers, laptop computers, tablets, mobile phones, etc.) and things (e.g., desk phones, security cameras, lighting, Heating, Ventilating, and Air-conditioning (HVAC), windows, doors, locks, medical devices, industrial and manufacturing equipment, etc.) within environments such as offices, hospitals, colleges and universities, oil and gas facilities, factories, and similar locations. Some of the unique challenges an enterprise network may face include interconnecting wired and wireless devices (e.g., WI-FI, mobile or cellular, infrared, etc.), on-boarding computing devices and things that can appear anywhere in the network and maintaining connectivity when the devices and things migrate from location to location, supporting Bring Your Own Device (BYOD) capabilities, connecting and powering Internet of Things (IoT) devices, and securing the network despite the vulnerabilities associated with WI-FI access, cellular access, device mobility, BYOD, and IoT. Current approaches for deploying a network capable of providing these functions often require constant and extensive configuration and administration by highly skilled network engineers operating several different systems (e.g., directory-based identity services; Authentication, Authorization, and Accounting (AAA) services; Wireless Local Area Network (WLAN) controllers; Evolved Packet Core (EPC) equipment; 4th Generation (4G)/Long Term Evolution (LTE) or 5th Generation (5G) Core network equipment; Command Line Interfaces (CLIs) for each switch, router, or other network device of the network; etc.) and manually stitching these systems together. This can make network deployment and management difficult and time-consuming, and impede the ability of many organizations to innovate rapidly and to adopt new technologies.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1A:
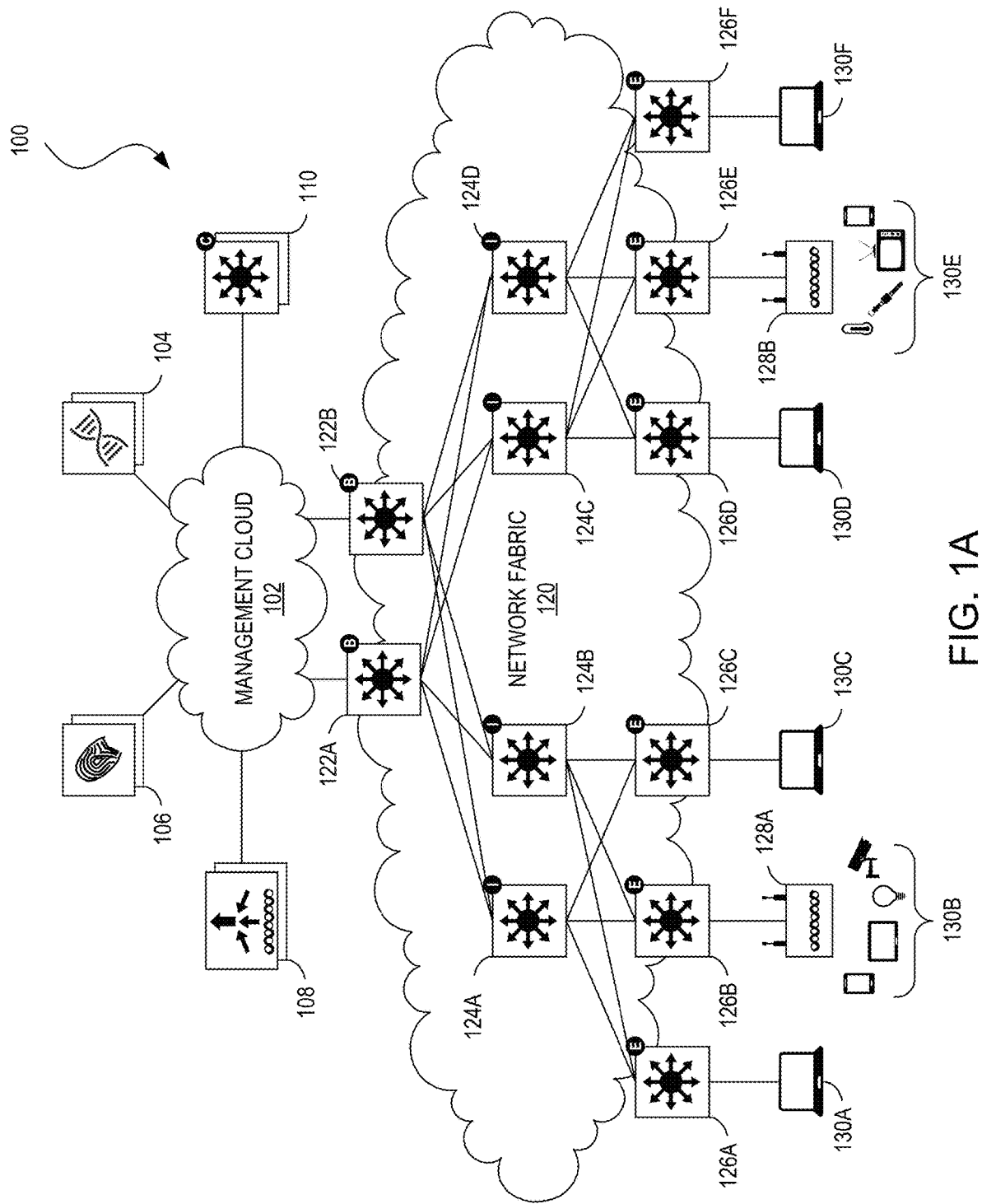
FIG. 1A illustrates an example of a physical topology for an enterprise network, in accordance with some embodiments.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods are provided for integrating Citizens Broadband Radio Service (CBRS) enabled devices into an enterprise network. The enterprise network can generate an International Mobile Subscriber Identity (IMSI) whitelist in an Authentication, Authorization, and Accounting (AAA) server. In addition to SIM authentication, the enterprise network can maintain the AAA server containing the IMSIs of enterprise-provisioned devices. After initial authentication, a Packet Data Network Gateway ("PGW") can validate the IMSI with the local device. The enterprise network can also generate a mapping of the IMSIs to International Mobile Equipment Identities (IMEIs) for (e.g., non-embedded) SIM cards. A cloud-hosted authentication system can maintain a mapping between IMSIs and IMEIs. This mapping can be controlled by the enterprise network. This can provide a binding between the device and the SIM. After authentication, the mobile core can request the IMEI. It can further determine if the IMEI maps to an IMSI. The enterprise network can also deploy Virtual Routing and Forwarding (VRFs) instances based on device policy. The PGW can further tunnel user traffic to specific VRFs.

Moreover, systems and methods are provided for integrating policies for heterogeneous wireless networks, such as Wi-Fi networks, cellular networks, Citizens Broadband Radio Service (CBRS) networks, and other radio networks. A network controller can receive user intent regarding the operation of multiple access networks (e.g., wired, Wi-Fi, cellular, CBRS, etc.) of an enterprise network. The network controller can subscribe to each of the multiple access networks for presence and telemetry information, including subscribing to a Wi-Fi network and a 4G/LTE or 5G Core network. The 4G/LTE or 5G Core network can subscribe to a 4G/LTE or 5G radio network for presence and telemetry information. The network controller can receive the presence and telemetry information from the Wi-Fi network, the 4G/LTE or 5G Core network, and/or the 4G/LTE or 5G radio network. The network controller can provide a combined view of the presence and telemetry information from the Wi-Fi network, the 4G/LTE or 5G Core network, and/or the 4G/LTE or 5G radio network.

Example Embodiments

Enterprise networks can be designed and deployed to provide wireless network access for general-purpose computing devices (e.g., servers, workstations, desktop computers, laptop computers, tablets, mobile phones, etc.) and things (e.g., desk phones, security cameras, lighting, HVAC, windows, doors, locks, medical devices, industrial and manufacturing equipment, and other IoT devices) (sometimes also referred to as clients, servers, hosts, computing systems, endpoints, electronic devices, user devices, User Equipment (UE) devices, etc.) within environments such as offices, hospitals, colleges and universities, oil and gas facilities, factories, and similar locations. With wireless network access, these devices can connect to private networks (e.g., campus or access networks, data centers, branch networks, etc.) and public networks (e.g., the Internet, Infrastructure as a Service (IaaS) networks, Platform as a Service (PaaS) networks, Software as a Service (SaaS) networks, other Cloud Service Provider (CSP) networks, etc.) without being tethered to a specific location. The wireless network access technologies can include Wireless Personal Area Networks (WPANs) (e.g., Bluetooth, ZIG-BEE, Z-WAVE, etc.), Wi-Fi (e.g., Institute of Electrical Electronic Engineers (IEEE) 802.11x, such as 802.11a, 802.11h, 802.11g, 802.11n, 802.11ac, 802.11ax, etc.) or Wireless Local Area Networks (WLANs), and Wireless Wide Area Networks (WWANs) or cellular networks (e.g., 4G/LTE, 5G, etc.).

Another wireless network access technology that can be integrated by enterprise networks is CBRS (sometimes also referred to as private LTE, private 5G, OnGo, etc.). CBRS operates in a 150 MHz wide spectrum of the 3.5 GHz band (e.g., 3550-3700 MHz frequency range in the United States), and thus CBRS is unlikely to interfere or be interfered with by Wi-Fi and cellular devices. For some devices, like life-sustaining medical equipment that need guaranteed, always-on connectivity or industrial IoT devices or other robots that have specific mobility requirements, CBRS can complement Wi-Fi, cellular, and other wireless networks.

Wi-Fi, cellular, and CBRS networks have different advantages and drawbacks relative to one another. Building a cellular network to provide ubiquitous, robust connectivity (e.g., backhaul links cannot be cut, cellular network infrastructure is often restored first after a disaster, etc.) to devices operating across vast distances can be a costly endeavor that relies on monthly and metered subscriptions to cover expenses. Wi-Fi network equipment can connect devices within the same general physical location, such as a home or a building, and is relatively inexpensive in comparison. In addition, Wi-Fi operates in unlicensed frequencies that do not require bidding for rights to use them. Mobile and cellular standards are also different from Wi-Fi in that a cellular device can require a significantly higher license cost for the technology itself. For example, Wi-Fi devices, which are based on IEEE standards, can have a per-device cost for associated licenses that is dramatically lower than for LTE/4G or 5G devices.

Cellular networks may be suitable for mobile usage in cases in which it can be critical for a user to have a consistent, persistent connection. For example, a mobile user may walk from place to place while making a phone call, answer email from a bus, or stream a podcast while driving, and so on. These may be situations in which the user may be intolerant of gaps in network coverage. The mobile user is also unlikely to consume a lot of data under these circumstances. Wi-Fi and CBRS networks, on the other hand, may be particularly suitable for nomadic usage where it can be more important to have a stable connection (e.g., relatively more tolerant of coverage gaps) and to be able to consume large amounts of data at little to no cost. For example, a nomadic user can decamp from place to place but may sit down for extended periods of time to do data-intensive work, such as receiving large files, editing them, and sending them back online. The same users, on the same devices, can be mobile users or nomadic users at different periods of times, and network operators are beginning to incorporate Wi-Fi, cellular, and CBRS network infrastructure into their own networks for increased flexibility, availability, and capacity, among other benefits. However, it can be challenging to manage these separate access technologies as integrated systems with unified policy, security, and analytics in view of the differences among them in terms of cost, infrastructure layout, the level of administrative control they can provide, and the like. Users and devices need to move between these different wireless systems, and network operators want the experience to be seamless and easy to manage at scale.

Enterprises have well-established security policies for Wi-Fi and wired devices. This includes policies for employee devices (e.g., laptops, tablets, etc.), Bring Your Own Device (BYOD) equipment (e.g., smartphones, wearable devices, etc.), and enterprise-owned Internet of Things (IoT) devices. The security policies can involve access authentication (e.g., Institute of Electrical and Electronic Engineers (IEEE) 802.1x, Pre-Shared Keys (PSK), Media Access Control (MAC) authentication, etc.) followed by segmentation. Unfortunately, these mechanisms may not work in the context of CBRS-enabled devices in the enterprise. For example, CBRS-enabled devices may not implement IEEE 802.1x and/or may not have MAC addresses. As a result, a new integration solution is needed to integrate CBRS systems into the enterprise.

In some instances, in CBRS, the responsibility of providing appropriate Quality of Service (QoS) to devices typically falls on an operator deploying the CBRS network. In maintaining the necessary QoS, CBRS network operators may need to consider interferences and/or interruptions from other users of the CBRS frequency band. CBRS specifies various tiers of users. Table 1 shows an example of CBRS spectrum access priority, according to an example embodiment. In Table 1, there are three types of users: Tier 1 users or Incumbent Users, Tier 2 users or Priority Access Licensees (PALs), and Tier 3 users or General Authorized Access (GAA) users.

TABLE 1

Example of CBRS Spectrum Access Priority

| Tier | Description |
| --- | --- |
| Tier 1 | Incumbent users of the 3550-3700 MHz spectrum (e.g., DoD and fixed satellite services that are not interfered by priority access licensees and general authorized access users) |
| Tier 2 | Priority access licensees of the 3550-3650 MHz spectrum (e.g., up to seven 10 MHz spectrum blocks that can be dynamically allocated in region or census tract with individual licensees able to have a maximum of four licenses per region) |
| Tier 3 | General authorized access of the 3550-3700 MHz spectrum (e.g., best-effort access that is subordinate to incumbent users and priority access licensees) |

Tier 1 users may have the highest priority and can be characterized as super users in the sense that they have access to all allocated channels of the CBRS spectrum and take priority over all other users. Some examples of the Tier 1 users include equipment of the U.S. Department of Defense (DoD) (e.g., navy ships, military radar, etc.) and fixed satellite service earth stations, among others.

Tier 2 users may have a lower priority than the Tier 1 users but a higher priority than the Tier 3 users. Tier 2 users can be granted exclusive access (relative to GAA users) in the 3550-3650 MHz band in certain geographic regions. For example, Tier 2 users can collectively be allowed to use a maximum of seven 10 MHz channels in a census tract or an area but no PAL licensee can take more than 4 PAL channels in a census tract. Tier 2 users may license the PAL channels from the United States Federal Communications Commission (FCC) in a limited geographic area. Some examples of the Tier 2 users include emergency services (e.g., ambulances, fire department, police, etc.), mobile or cellular network providers, and Internet Service Providers (ISPs), among others.

Tier 3 users may have the lowest priority and can be subordinate to both Tier 1 users and Tier 2 users. Tier 3 users may be allowed access to all channels in the CBRS band to the extent they are not being used by higher priority users. A frequency band can be dynamically allocated to Tier 3 users so that they do not interfere with the Tier 1 users and Tier 2 users. Since Tier 3 users may be forced to vacate the CBRS network at any point in time, they only have best-effort access. In other words, Tier 3 users may be forced to offload from CBRS all of their UE devices to free the CBRS frequency band for higher priority users.

An offload process (offloading) is a process in which one of the Tier 3 users (e.g., an enterprise which provides a private radio network in the CBRS band) may be required to vacate a CBRS frequency band and move all of its devices to a different frequency or to a different radio access network, such as a Wi-Fi network or a cellular network. The FCC requires that Tier 3 users offload from the CBRS frequency band within 300 seconds or less after receiving a notification from a Spectrum Access System (SAS). In some embodiments, offloading can be triggered by a lower tier CBRS user receiving a notification to move from the CBRS frequency band, and can end at a 300 second mark or earlier when the CBRS-enabled devices of the lower tier CBRS user move to a different network or frequency band and the lower tier CBRS user notifies the SAS that offload is complete.

Intent-Based Networking (IBN) can address some of the challenges faced by modern networks by transforming a conventional hardware-centric, manually configured network into a controller-led network that can capture business intent and translate it into policies that can be automated and applied consistently across the network. A goal of IBN is for the network to continuously monitor and adjust network performance to help assure desired business outcomes. IBN builds on recent innovations, such as Software-Defined Networking (SDN), by using a network controller that can act as a central control point for network activity. Such controllers enable the abstraction of the network as an integrated whole. Controller-led networks in various domains (e.g., LANs, WANs, data centers, CSP networks, etc.) can collaborate and extend their benefits throughout an enterprise and help to digitize business operations, functions, models, processes, activities, and the like.

Some of the functional elements of IBN for delivering intent—or, support for the business or technological outcomes that an organization desires—include the capture and translation of intent into policies that the network can act upon, the activation of these policies across the physical and virtual network infrastructure using network-wide automation, and assurance (e.g., via analytics, machine learning, artificial intelligence, etc.) to continuously monitor the network to verify that the desired intent has been applied and the business outcomes are being achieved. While some progress has been made for implementing IBN in wired and Wi-Fi networks, there is a need to extend IBN to cellular and CBRS networks. For example, there is a need for network-agnostic policies (e.g., policies that can be equally applied to a device whether it is connected to a wired network, Wi-Fi network, cellular network, CBRS network, etc.), such as a policy to block certain application traffic from all devices or prohibiting any user traffic in specific locations.

Turning now to the drawings, FIG. 1A illustrates an example of an enterprise network 100. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more AAA appliances 106, wireless network infrastructure equipment 108 (e.g., WLCs, EPC equipment, 4G/LTE or 5G Core network equipment, etc.), and one or more fabric control plane nodes 110. In other embodiments, one or more elements of the management cloud 102 may be co-located with the network fabric 120.

The network controller appliances 104 can function as the command and control system for one or more network fabrics, and can house automated workflows for deploying and managing the network fabrics. The network controller appliances 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliances 104.

The AAA appliances 106 can control access to computing resources, facilitate enforcement of network policies, audit usage, and provide information necessary to bill for services. The AAA appliance can interact with the network controller appliances 104 and with databases and directories containing information for users, devices, things, policies, billing, and similar information to provide authentication, authorization, and accounting services. In some embodiments, the AAA appliances 106 can utilize Remote Authentication Dial-In User Service (RADIUS) or Diameter to communicate with devices and applications. In some embodiments, one or more Cisco® Identity Services Engine (ISE) appliances can operate as the AAA appliances 106.

The wireless network infrastructure equipment 108 can support fabric-enabled base stations and access points attached to the network fabric 120, handling traditional tasks associated with a WLC or 4G/LTE or 5G Core network equipment as well as interactions with the fabric control plane for wireless endpoint registration and roaming. In some embodiments, the network fabric 120 can implement a wireless deployment that moves data-plane termination (e.g., Virtual Extensible Local Area Network (VXLAN)) from a centralized location (e.g., with previous overlay Control and Provisioning of Wireless Access Points (CAPWAP) deployments) to a wireless base station or access point/fabric edge node. This can enable distributed forwarding and distributed policy application for wireless traffic while retaining the benefits of centralized provisioning and administration. In some embodiments, one or more Cisco® Catalyst® controllers, Cisco® Wireless Controllers, Cisco® Wireless Local Area Network (LAN), and/or other Cisco DNA™-ready wireless controllers can operate as the wireless network infrastructure equipment 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane nodes 110 are shown to be external to the network fabric 120 in this example, in other embodiments, the fabric control plane nodes 110 may be co-located with the network fabric 120. In embodiments where the fabric control plane nodes 110 are co-located with the network fabric 120, the fabric control plane nodes 110 may comprise a dedicated node or set of nodes or the functionality of the fabric control nodes 110 may be implemented by the fabric border nodes 122.

The fabric control plane nodes 110 can serve as a central database for tracking all users, devices, and things as they attach to the network fabric 120, and as they roam around. The fabric control plane nodes 110 can allow network infrastructure (e.g., switches, routers, WLCs, etc.) to query the database to determine the locations of users, devices, and things attached to the fabric instead of using a flood and learn mechanism. In this manner, the fabric control plane nodes 110 can operate as a single source of truth about where every endpoint attached to the network fabric 120 is located at any point in time. In addition to tracking specific endpoints (e.g., /32 address for IPv4, /128 address for IPv6, etc.), the fabric control plane nodes 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless base stations and access points 128B and 128E (collectively, 128), respectively, which in turn can connect by wire to fabric edge nodes 126B and 126E, respectively. In some embodiments, Cisco® Catalyst® access points, Cisco Aironet® access points, Cisco Meraki® MR access points, and/or other Cisco DNA™-ready access points can operate as the wireless base stations and access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the wireless network infrastructure equipment 108 notifying the fabric control plane nodes 110 of joins, roams, and disconnects by the wireless endpoints 130 such that the fabric control plane nodes can have connectivity information about both wired and wireless endpoints in the network fabric 120, and can serve as the single source of truth for endpoints connected to the network fabric. For data plane integration, the wireless network infrastructure equipment 108 can instruct the fabric wireless base stations and access points 128 to form a VXLAN overlay tunnel to their adjacent fabric edge nodes 126. The VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless base stations and access points 128, the wireless network infrastructure equipment 108 can onboard the endpoints into the network fabric 120 and inform the fabric control plane nodes 110 of the endpoints' Media Access Control (MAC) addresses (or other identifiers). The wireless network infrastructure equipment 108 can then instruct the fabric wireless base stations and access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane nodes 110 to form a mapping between the endpoints' MAC and IP addresses, and traffic to and from the wireless endpoints 130 can begin to flow.

Figure 1B:
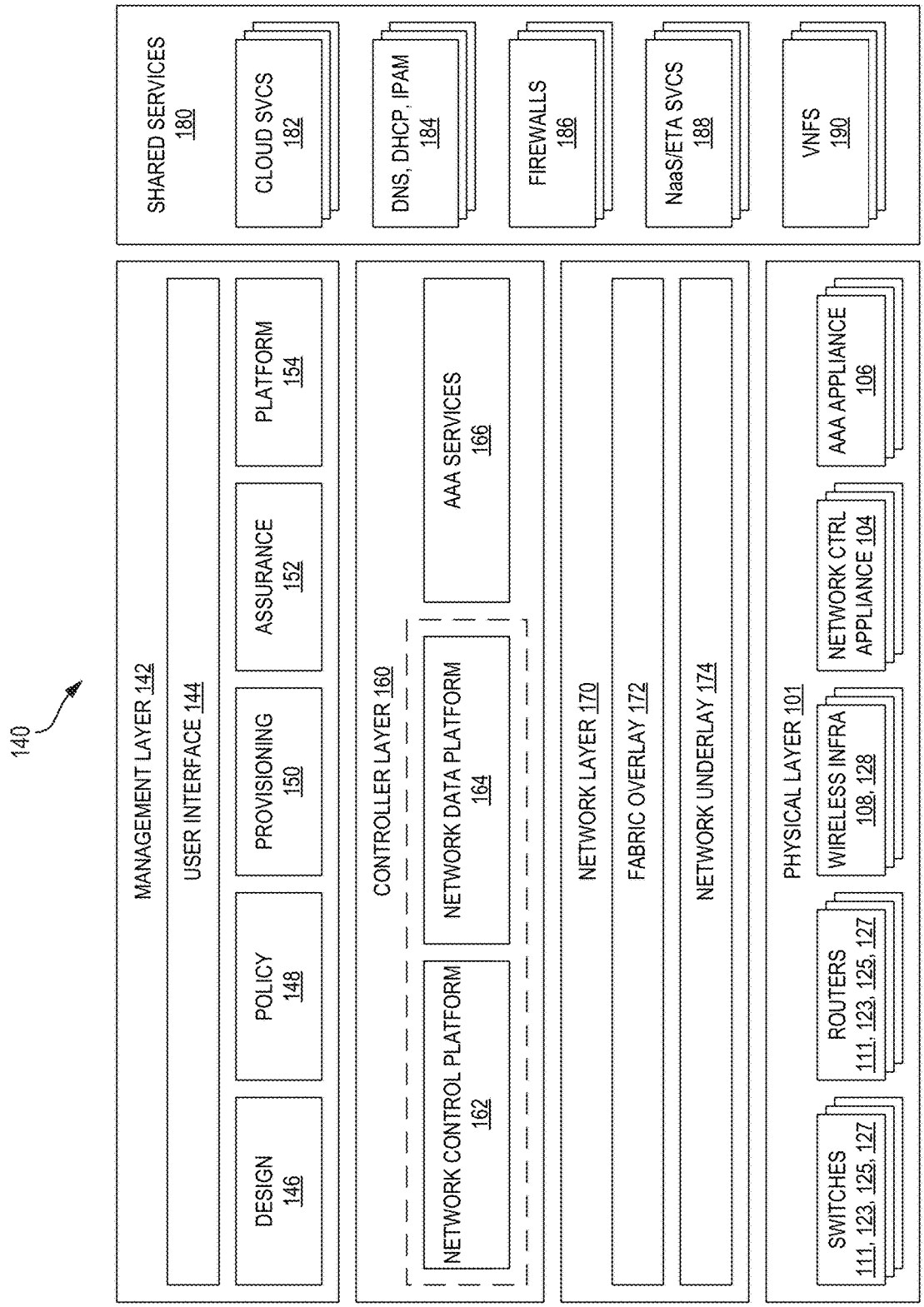
FIG. 1B illustrates an example of a logical architecture for an enterprise network, such as the enterprise network of FIG. 1A, in accordance with some embodiments.

FIG. 1B illustrates an example of a software architecture or logical architecture 140 for an enterprise network. One of ordinary skill in the art will understand that, for the logical architecture 140 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 140 includes a management layer 142, a controller layer 160, a network layer 170, the physical layer 101, and a shared services layer 180.

The management layer 142 can abstract the complexities and dependencies of other layers and provide a user with tools and workflows to manage an enterprise network (e.g., the enterprise network 100). The management layer 142 can include a user interface 144, design functions 146, policy functions 148, provisioning functions 150, assurance functions 152, platform functions 154, and base automation functions. The user interface 144 can provide a user a single point to manage and automate the network. The user interface 144 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 144 may also provide visibility information, such as views of a network, network infrastructure, computing devices, and things. For example, the user interface 144 can provide a view of the status or conditions of the network, the operations taking place, services, performance, a topology or layout, protocols implemented, running processes, errors, notifications, alerts, network structure, ongoing communications, data analysis, and so forth.

The design functions 146 can include tools and workflows for managing site profiles, maps and floor plans, network settings, and IP address management, among others. The policy functions 148 can include tools and workflows for defining and managing network policies. The provisioning functions 150 can include tools and workflows for deploying the network. The assurance functions 152 can use machine learning and analytics to provide end-to-end visibility of the network by learning from the network infrastructure, endpoints, and other contextual sources of information. The platform functions 154 can include tools and workflows for integrating the network management system with other technologies. The base automation functions can include tools and workflows to support the policy functions 148, the provisioning functions 150, the assurance functions 152, and the platform functions 154.

In some embodiments, the design functions 146, the policy functions 148, the provisioning functions 150, the assurance functions 152, the platform functions 154, and the base automation functions can be implemented as microservices in which respective software functions are implemented in multiple containers communicating with each rather than amalgamating all tools and workflows into a single software binary. Each of the design functions 146, policy functions 148, provisioning functions 150, assurance functions 152, and platform functions 154 can be viewed as a set of related automation microservices to cover the design, policy authoring, provisioning, assurance, and cross-platform integration phases of the network lifecycle. The base automation functions can support the top-level functions by allowing users to perform certain network-wide tasks.

The controller layer 160 can comprise subsystems for the management layer 142 and may include a network control platform 162, a network data platform 164, and AAA services 166. These controller subsystems can form an abstraction layer to hide the complexities and dependencies of managing many network devices and protocols.

The network control platform 162 can provide automation and orchestration services for the network layer 170 and the physical layer 101, and can include the settings, protocols, and tables to automate management of the network and physical layers. For example, the network control platform 162 can provide the design functions 146, the policy functions 148, the provisioning functions 152, and the platform functions 154. In addition, the network control platform 162 can include tools and workflows for discovering switches, routers, wireless controllers, and other network devices (e.g., the network discovery tool); maintaining network and endpoint details, configurations, and software versions (e.g., the inventory management tool); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 162 can communicate with network devices using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 162.

The network data platform 164 can provide for network data collection, analytics, and assurance, and may include the settings, protocols, and tables to monitor and analyze network infrastructure and endpoints connected to the network. The network data platform 164 can collect multiple types of information from network devices, including syslog, SNMP, NetFlow, Switched Port Analyzer (SPAN), and streaming telemetry, among others. The network data platform 164 can also collect use contextual information shared from In some embodiments, one or more Cisco DNA™ Center appliances can provide the functionalities of the management layer 142, the network control platform 162, and the network data platform 164. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 166 can provide identity and policy services for the network layer 170 and physical layer 101, and may include the settings, protocols, and tables to support endpoint identification and policy enforcement services. The AAA services 166 can provide tools and workflows to manage virtual networks and security groups, and to create group-based policies and contracts. The AAA services 166 can identify and profile network devices and endpoints using AAA/RADIUS, 802.1X, MAC Authentication Bypass (MAB), web authentication, and EasyConnect, among others. The AAA services 166 can also collect and use contextual information from the network control platform 162, the network data platform 164, and the shared services 180, among others. In some embodiments, Cisco® ISE can provide the AAA services 166.

The network layer 170 can be conceptualized as a composition of two layers, an underlay 174 comprising physical and virtual network infrastructure (e.g., routers, switches, WLCs, etc.) and a Layer 3 routing protocol for forwarding traffic, and an overlay 172 comprising a virtual topology for logically connecting wired and wireless users, devices, and things and applying services and policies to these entities. Network devices of the underlay 174 can establish connectivity between each other, such as via IP. The underlay may use any topology and routing protocol.

In some embodiments, the network controller appliances 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 172 can be a logical, virtualized topology built on top of the physical underlay 174, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/Identifier Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, QoS, capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNID) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a Virtual Routing and Forwarding (VRF) instance and referred to as a Virtual Network (VN). That is, a VN is a logical network instance within the network fabric 120 defined by a Layer 3 routing domain and can provide both Layer 2 and Layer 3 services (using the VNID to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Security Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 101 can comprise various network devices, such as the switches and routers 111, 123, 125, and 127, the wireless network infrastructure equipment 108, the wireless base stations and access points 128, the network controller appliances 104, and the AAA appliances 106, among others.

The shared services layer 180 can provide an interface to external network services, such as cloud services 182; Domain Name System (DNS), DHCP, IP Address Management (IPAM), and other network address management services 184; firewall services 186; Network as a Sensor (NaaS)/Encrypted Threat Analytics (ETA) services 188; and Virtual Network Functions (VNFs) 190; among others. The management layer 142 and/or the controller layer 160 can share identity, policy, forwarding information, and so forth via the shared services layer 180 using APIs.

Figure 2:
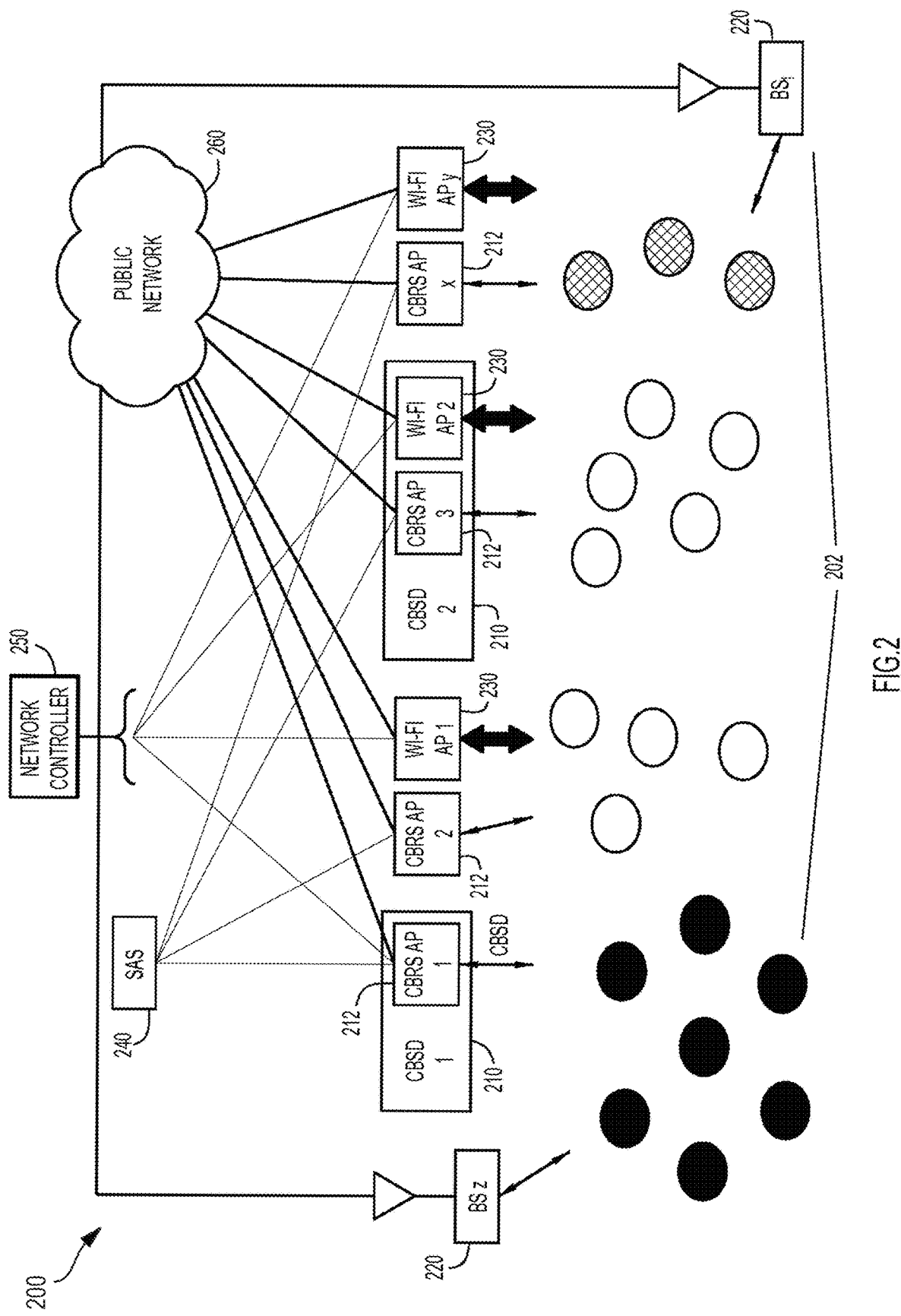
FIG. 2 illustrates an example of a heterogeneous wireless network, in accordance with some embodiments.

FIG. 2 illustrates of an example of a heterogeneous wireless network 200, such as a network capable of providing User Equipment (UE) devices network access via a Wi-Fi network, cellular network, CBRS, and/or other radio network. In this example, the heterogeneous wireless network 200 includes User Equipment (UE) devices 202 (shown as circles), CBRS Devices (CBSDs) 210 (e.g., CBSD1 and CBSD2), CBRS APs 212 (e.g., CBRS AP 1, 2, . . . , x), base stations 220 (e.g., BS1, . . . , Bz) of a public radio network, Wi-Fi access points 230 (e.g., Wi-Fi AP1, 2, . . . , y), a Spectrum Access System (SAS) 240, a network controller 250, and a public IP network 260. Some of the CBSDs 210 may include CBRS APs 212. The CBSDs 210, BSs 220, and Wi-Fi APs 230 can connect the UE devices 202 to the public IP network 260. The public IP network 260 may include a public data network, such as the Internet.

In FIG. 2, at least some of the UE devices 202 may be CBRS-enabled such that they can connect to the public IP network 260 via a CBRS network. For example, the UE devices 202 can attach to a CBRS network comprising the CBRS APs 212. Some of the CBRS APs 212 may be standalone devices, such as the CBRS AP 2 and CBRS AP x, while others can be integrated with other components and are part of another device such as is the case for the CBRS AP 1 and CBRS AP 3 in which the CBRS AP 1 is part of the CBSD 1 and CBRS AP 3 is part of the CBSD 2.

The CBSD 1 may also include a controller (not shown). A CBSD that includes a controller can be an evolved NodeB (eNodeB), defined in a Universal Mobile Telecommunications System (UMTS) standard. The CBSD 2 may be an integrated AP device that includes the CBRS AP 3 and also the Wi-Fi AP 2.

The SAS 240 can operate as a controller for the CBSDs 210 and the CBRS APs 212. The SAS 240 can manage the CBRS spectrum and maintain a database of spectrum usage by all users, including Tier 1 users, Tier 2 users, and Tier 3 users (as shown in Table 1), in all census tracts or areas. The SAS 240 can allocate channels to the CBRS APs 212 using a variety of rules. For example, the SAS 240 can consider multiple factors and inform the CBRS APs 212 and the CBSDs 210 of the operating parameters including allocated frequency band, allocated channel, and/or maximum effective isotropic radiated power that can be used at a given point in time. The SAS 240 can also provide the FCC required 300 second notification that an enterprise (e.g., a Tier 3 or GAA user) needs to offload its UE devices 202 from the CBRS network.

When the enterprise is forced to offload its UE devices 202, the UE devices 202 may be offloaded to a cellular network provided via the BSs 220 or to a Wi-Fi network provided via the Wi-Fi APs 230. In FIG. 2, based on the 300 second notification provided by the SAS 240 to the CBSD 1, a set of UE devices 202 attached to the CBRS AP 1 (shaded circles) may be offloaded from the CBRS AP 1 to the BSz, as an example. The set of the UE devices 202 can continue to obtain access to the public IP network 260 via the BSz and are offloaded from the CBRS network. According to another example embodiment, another set of the UE devices 202 (e.g., cross hatched circles) may be offloaded to a Wi-Fi network provided via the Wi-Fi AP y.

The Wi-Fi APs 230 can be managed and controlled by the network controller 250. The network controller 250 may include a WLC. In one example embodiment, the network controller 250 may also include an interworking function (IWK) to manage the CBRS APs 212 or operate as a controller for at least some of the CBRS APs 212. The network controller 250 may generate policies and push the policies to various access points for execution. For example, the network controller 250 may run analytics to develop CBRS offloading policies. It is also possible, however, some or all of the functions of the network controller 250 may be implemented within one or more of the CBSDs 210 or the CBRS APs 212.

Figure 3:
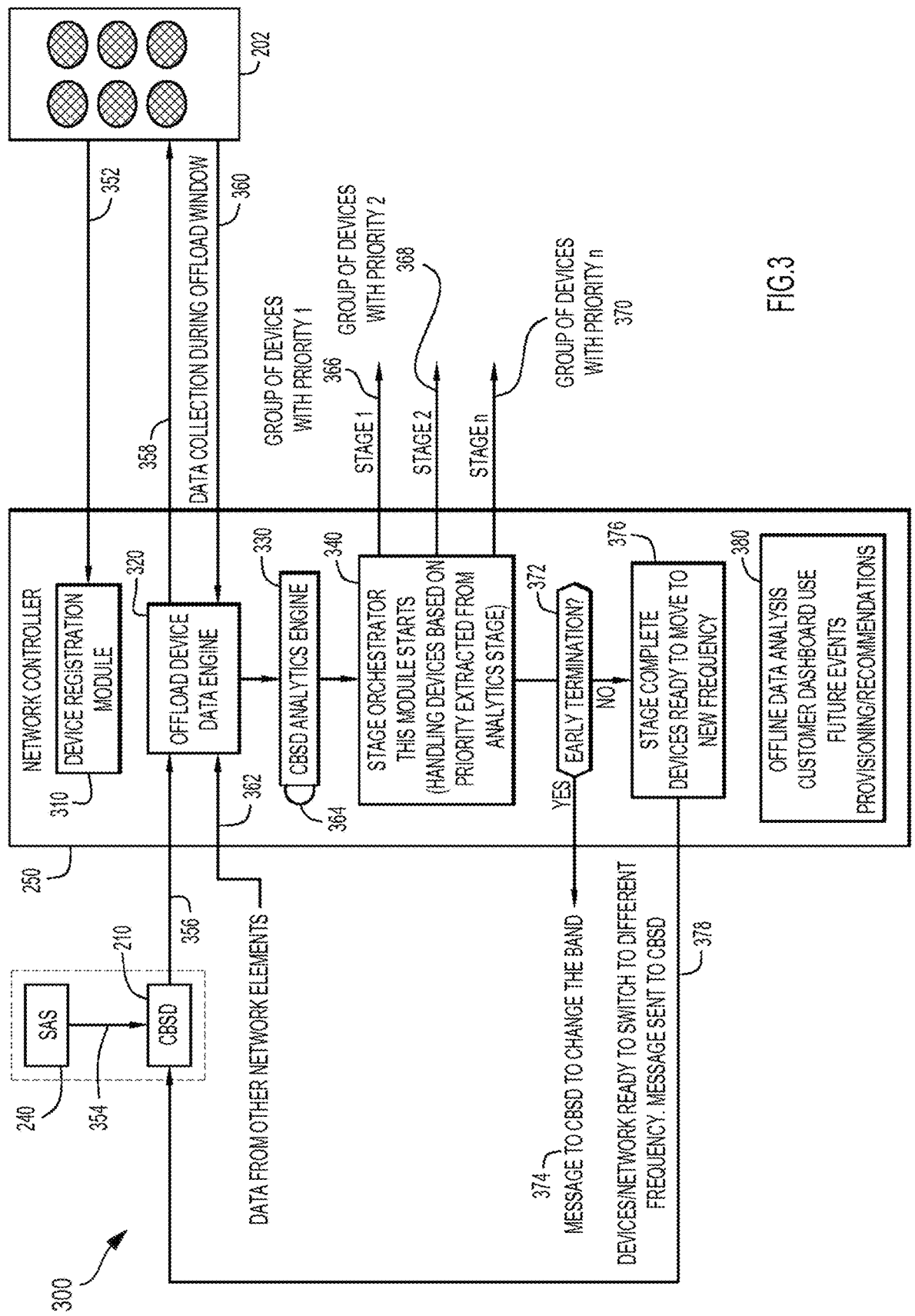
FIG. 3 illustrates an example of an operational diagram showing a process for orchestrating the offloading of user devices from a private radio network based on an impact determined on at least one performance parameter of the devices, in accordance with some embodiments.

FIG. 3 illustrates an example of an operational diagram showing a process 300 for orchestrating the offloading of user devices from a private radio network based on an impact determined on at least one performance parameter of the devices. One of ordinary skill will understood that, for any processes discussed herein, there can be additional, fewer, or alternative steps performed in similar or alternative orders, or in parallel, within the scope of the various embodiments unless otherwise stated.

In this example, the network controller 250 includes several functional modules/engines, such as a device registration module 310, an offload device data engine 320, a CBSD analytics engine 330, and a stage orchestrator 340. In an example embodiment, the device registration module 310, the offload device data engine 320, the CBSD analytics engine 330, and the stage orchestrator 340 ensure performance parameters, such as throughput and latency, during the offloading process, as explained in further detail below.

In one embodiment, the device registration module 310, the offload device data engine 320, the CBSD analytics engine 330, and the stage orchestrator 340 are software components that are implemented in the network controller 250. However, one of ordinary skill in the art may readily appreciate that these software components or modules may be implemented elsewhere, depending on various implementation details. For example, the device registration module 310, the offload device data engine 320, the CBSD analytics engine 330, and the stage orchestrator 340 may be software running in a cloud or may be software modules integrated into one or more of the CBSDs 210.

According to another example embodiment, various software modules may be implemented in various hardware devices. For example, the device registration module 310, the offload device data engine 320, the CBSD analytics engine 330 may be implemented by the network controller 250 and each of the CBSDs 210 implements the stage orchestrator 340.

In an example embodiment, based on the notification from a regulatory authority or agency, assured performance parameters for the UE devices 202 are provided during the private network offloading, by using these software modules, as detailed below.

When notified by the SAS 240 that the private radio network needs to move to a different frequency/band within 300 seconds, providing the predictability to performance of the UE devices 202 is important to ensure seamless and assured services of these UE devices 202 during the offload process. Many mission-critical systems have very strict requirements on parameters like throughput, latency, etc. and even for non-mission critical systems, understanding the behavior of these parameters helps provide assured and deterministic services during the offload process.

In FIG. 3, the network controller 250 may be in communication with the UE devices 202, for example, via APs such as the WI-FI APs 230. Also, the network controller 250 may be in communication with the UE devices 202 via the CBRS APs 212 that can be integrated into the CBSD 210. In various example embodiments, the UE devices 202 and other network elements (not shown) may provide various data, metrics, and Key Performance Indicator (KPI) parameters to the network controller 250 to be considered during a handover/band change process and optionally, during normal operation, as explained in further detail below.

The device registration module 310 is an interface for registration of the UE devices 202 in the private network (e.g., CBRS network) for obtaining telemetry data. Some of the UE devices 202 may have an auto-registration mechanism, whereas other UE devices 202 may use an Application Programming Interface (API) for the registration. At 352, the UE devices 202 in the private network register with the network controller 250. During the registration process, each of the UE devices 202 advertises its capabilities. A handshake mechanism between the network controller 250 and the respective UE devices 202 identifies data which the respective UE device can provide to the network controller 250 during the offload process. Each of the UE devices 202 provides its device specific parameters such as a device type (e.g., category and model), network capabilities, minimum required throughput, maximum allowed latencies, and so on.

In an example embodiment, SAS 240 may detect a priority user for a frequency band being used by the CBSD 210. As such, SAS 240 generates an incumbent signal indicating that the CBSD 210 has 300 seconds to stop using the frequency band assigned to the CBSD 210. At 354, the incumbent signal is provided by the SAS 240 to the CBSD 210. The CBSD receives the incumbent signal and starts the offloading process. At 356, the CBSD 210 provides an offload event signal to the network controller 250.

Based on receiving the incumbent signal from the CBSD 210, the network controller 250 will execute the offload device data engine 320 to gather data from the UE devices 202. At 358, the offload device data engine 320 will provide a data collection request to each of the UE devices 202 that need to be offloaded from the CBRS network. That is, the offload device data engine 320 will identify the UE devices 202 attached to the CBSD 210, based on the prior registration at 352, and to each of the UE devices 202 identified/registered with the network controller 250, the offload device data engine 320 sends a push or a pull data collection request.

At 360, the offload device data engine 320 collects data, which includes real-time data and other important performance parameters, from each of the UE devices 202. The collected data is tagged with an appropriate index for further analysis. Real-time data and performance KPI parameters may include specific values obtained from a respective UE device such as sensor values and the current state of the respective UE device. For example, the respective UE device may indicate that it is in a middle of a financial transaction, in a middle of a data download or upload, in a middle of a communication, or is in an idle state.

In an example embodiment, the network controller 250 stores the parameters obtained by the offload device data engine 320 from the UE devices 202 during an offload window. In an example embodiment, the data gathered during the offload window or during the handover process provides key insight regarding performance during the offload process. Since the data is collected during the offload process, explicit tagging of the data with the context is useful to provide for accurate insights. That is, data collected during regular operation e.g., by the device registration module 310, may skew the offload insights because large amounts of data collected during regular operation may dominate the data collected during the offload window. Accordingly, tagging data collected during the offload process ensures that the other data does not skew the offload insights and the offload analytics are accurate.

At 362, the offload device data engine 320 also collects data from other network elements. For example, data can include telemetric values and KPI parameters, which will improve the accuracy of the analytics.

At 364, the CBSD analytics engine 330 extracts insight from the offload data and assigns priority to the devices in the network. In an example embodiment, the CBSD analytics engine 330 obtains, as input, data collected by the offload device data engine 320, at 360 and 362. The CBSD analytics engine 330 analyzes these data to determine priority rules. In an example embodiment, analysis can include simple fixed policies, statistical models, and/or machine learning (ML), as explained in further detail below. The analysis results in identifying various criteria for prioritizing the devices during an offloading process. For example, the CBSD analytics engine 330 identifies the following items: 1) range of thresholds for various performance parameters, speed, and various latencies, 2) corresponding time of impact of each parameter, and 3) parameter priority. The CBSD analytics engine 330 classifies the devices based on one or more of these three items and outputs priority rules for the UE devices 202. The priority rules are provided to the stage orchestrator 340 for handling the UE device 202 during the offloading process.

In an example embodiment, the stage orchestrator 340 facilitates offloading of the UE devices 202 from the CBRS network. In other words, the stage orchestrator 340 facilitates sequential transition (transition in stages) of the UE devices 202 from the CBRS network based on (pre-provisioned) polices about the priority. The UE devices 202 may need to perform certain functions before performance parameters are impacted and as such may be assigned a higher priority. For example, some of the UE devices 202 are prioritized based on whether they need to finish time bound tasks, such as saving states, whether they need to complete transactions with a peer or an external entity, whether they need to ensure buffers are cleared, whether they need to communicate to running applications and/or servers about the required offload so that they can adjust accordingly. In an example embodiment, the stage orchestrator 340 calculates a best possible sequence of events based on the priority, policies, or causal relationships between UE devices 202 or other network devices and communicates that sequence to the UE devices 202.

At 366 during Stage 1, the stage orchestrator 340 handles a first group of devices with the highest priority (priority 1). At 368 during Stage 2, the stage orchestrator 340 handles a second group of device with lower priority than the first group (priority 2), and continues to handle devices based on the priority such that at 370 during Stage n, the stage orchestrator 340 handles nth group of devices having the lowest priority (priority n). The stage orchestrator 340 groups the UE devices 202 into various priority groups based on various insights from the CBSD analytics engine 330 obtained using device requirements, fixed rules, statistical models, behavioral algorithms, and/or ML algorithms.

In one example embodiment, the UE devices 202 are split into different priority groups based on speed impact during the offload process and the respective device's actual speed threshold requirement. For example, if the stage orchestrator 340 determines that the speed impact is within the respective device's actual speed threshold requirement, the respective device is placed in a lower priority group (e.g., group of devices with priority n). On the other hand, if one of the UE devices 202 is identified as vulnerable during the offload process by the CBSD analytics engine 330, the stage orchestrator 340 assigns this device to a higher priority group (e.g., group of devices with priority 1) in order to help take mitigating actions. In an example embodiment, the stage orchestrator 340 can schedule work in parallel and not necessarily in sequence, unless causality is involved between entities.

When some of the UE devices 202 complete the offload process, they send an acknowledgement message back to the stage orchestrator 340. At 372, based on receiving an acknowledgement from all of the UE devices 202, the stage orchestrator 340 declares an early stage completion and at 374 transmits a message to the CBSD 210 to continue with the band/frequency change process. That is, the stage orchestrator 340 informs the CBSD 210 that all of the UE devices 202 are offloaded from the CBRS network. If an early termination is not possible (no at 372), the stage orchestrator 340 continues to wait for the acknowledgement message. When the devices are ready to move to a new frequency at 376, then at 378, the stage orchestrator 340 sends a message to the CBSD 210 indicating that the UE devices 202 are ready to switch to a different frequency or network (offloaded). In an example embodiment, the message may be generated and sent based on a predetermined timed threshold regardless of whether the acknowledgement messages have been received from all of the UE devices 202. Additionally, the stage orchestrator 340 may keep track of any issues during the stage progression.

Offline data analysis is performed at 380 when the network is not under offloading but during normal operations. The offline data analysis 380 may provide data insights using dashboards (presented on a display) and may predict or recommend any future events or provide recommendations for any new network provisioning with an assured key performance parameter. The offline data analysis 380 optimizes and predicts assured UE performance parameters and may classify the UE devices 202 during the provisioning stage.

According to one or more example embodiments, as per FCC guidelines, the system has 300 seconds to complete the offload process. The CBSD 210 waits for a notification from the network controller 250 before it proceeds with the frequency/band change unless the 300 seconds threshold has been reached. For graceful offloading, some of the UE devices 202 may need special handling. The network controller 250 provides the special handling by prioritizing these devices, thereby achieving assured performance parameters such as throughput and latency, before the frequency band is changed.

Figure 4A:
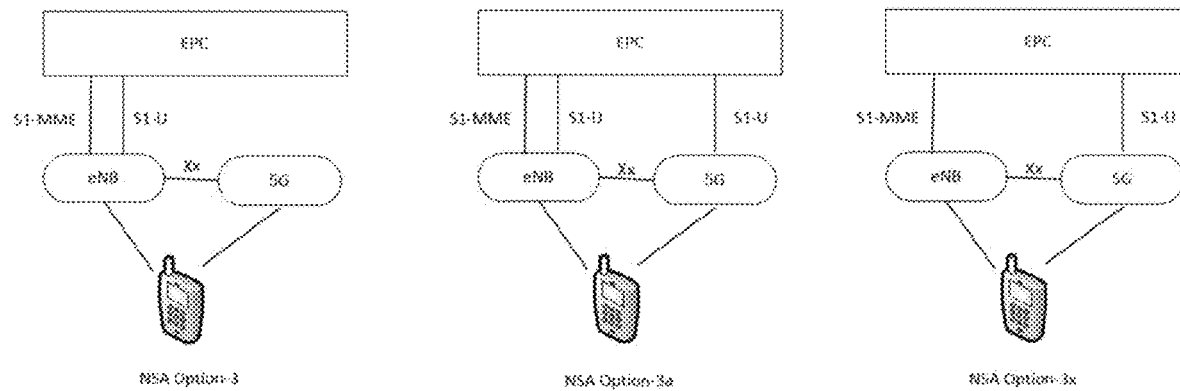
FIGS. 4A and 4B illustrate example approaches for implementing a 5th Generation (5G) non-standalone packet core network, in accordance with some embodiments.
Figure 4B:
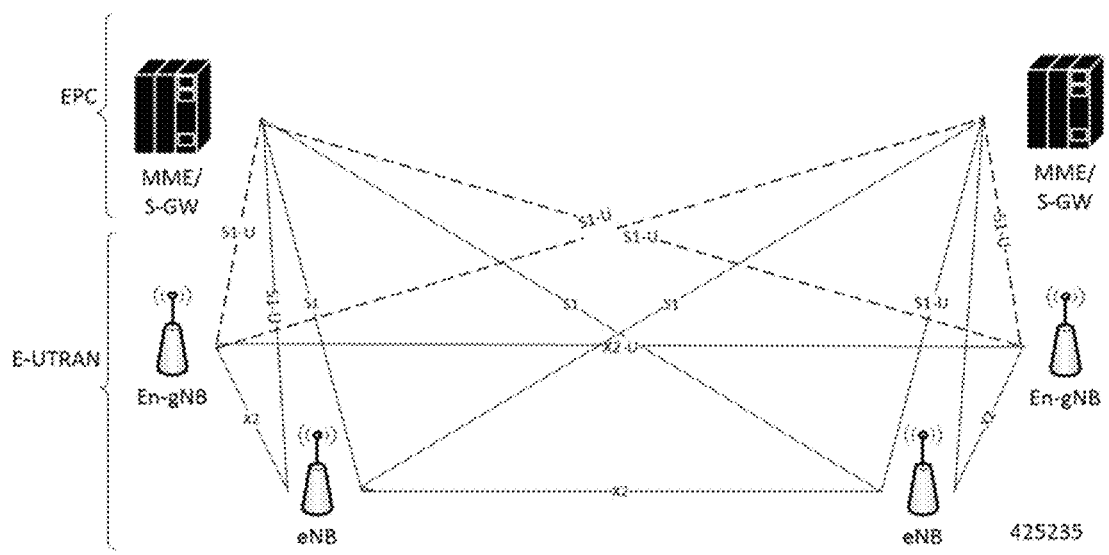

FIGS. 4A and 4B illustrate example approaches for implementing a 5G non-standalone packet core network. As discussed, 5G is the next generation of 3GPP technology, after 4G/LTE, defined for wireless mobile data communication. 5G will bridge wireless and wireline networks by introducing a major network architectural change from radio access to core. The 5G standards are introduced in 3GPP Release 15 to cater to the needs of 5G networks. The 5G framework will take advantage of the massive throughput and low latency that new radio provides. In 5G NSA, existing LTE radio access and core network (EPC) is used as an anchor for mobility management and coverage to add the 5G carrier. This solution enables operators to provide 5G services with shorter time and lesser cost. An example of an implementation of the 5G non-standalone packet core network is the Cisco® Ultra 5G NSA Packet Core solution.

The Cisco® Ultra 5G NSA Packet Core solution enables operators using Cisco® EPC Packet Core to launch 5G services in shorter time and leverage existing infrastructure. NSA leverages the existing LTE radio access and core network (EPC) to anchor 5G NR using the Dual Connectivity feature. This solution provides a seamless option to deploy 5G services with very less disruption in the network.

The Cisco® Ultra 5G NSA Packet Core solution is 3GPP compliant and can inter-operate with any RAN and network functions. Cisco® Mobility Management Entity (MME), Cisco® Serving GPRS Support Node (SGSN), Cisco®

Serving Gateway (SGW), Cisco® Packet Data Network Gateway (PGW), and Policy and Charging Rules Function (PCRF) will support the 5G NSA features. The initial deployments of 5G services are based on 5G NSA, also called option-3. The variants of option-3 are option-3, option-3a and option-3x.

FIG. 4A illustrates the interfaces and nodes for option-3 and the variants. Option-3/3a/3x are transparent to Mobility Management Entity (MME) and Packet Data Network (PDN) Gateway ("P-GW"), and translates to an E-RAB modification procedure at MME. In Option-3, traffic is split across 4G and 5G at eNodeB. In Option-3a, traffic is split across 4G and 5G at EPC (e.g., Serving Gateway ("S-GW")). In Option-3x, traffic is split across 4G and 5G at 5G cell. The Cisco® Ultra 5G NSA Packet Core solution runs on Cisco® ASR 5000, ASR 5500, and virtualized platforms.

FIG. 4B illustrates an example of the operation of the 5G NSA in an EPC network, including how the 5G NSA provides dual connectivity. The E-UTRA-NR Dual Connectivity (EN-DC) feature supports 5G New Radio (NR) with EPC. A UE connected to an eNodeB acts as a Master Node (MN) and an en-gNB acts as a Secondary Node (SN). The eNodeB is connected to the EPC through the S1 interface and to the en-gNB through the X2 interface. The en-gNB can be connected to the EPC through the S1-U interface and other en-gNBs through the X2-U interface.

If the UE supports dual connectivity with NR, then the UE must set the DCNR bit to "dual connectivity with NR supported" in the UE network capability IE of the Attach Request/Tracking Area Update Request message.

If the UE indicates support for dual connectivity with NR in the Attach Request/Tracking Area Update Request message, and the MME decides to restrict the use of dual connectivity with NR for the UE, then the MME sets the RestrictDCNR bit to "Use of dual connectivity with NR is restricted" in the EPS network feature support IE of the Attach Accept/Tracking Area Update Accept message.

If the RestrictDCNR bit is set to "Use of dual connectivity with NR is restricted" in the EPS network feature support IE of the Attach Accept/Tracking Area Update Accept message, the UE provides the indication that dual connectivity with NR is restricted to the upper layers.

If the UE supports DCNR and DCNR is configured on MME, and if HSS sends ULA/IDR with "Access-Restriction" carrying "NR as Secondary RAT Not Allowed", MME sends the "NR Restriction" bit set in "Handover Restriction List" IE during Attach/TAU/Handover procedures. Similarly, MME sets the RestrictDCNR bit to "Use of dual connectivity with NR is restricted" in the EPS network feature support IE of the Attach Accept/Tracking Area Update Accept message. Accordingly, UE provides the indication that dual connectivity with NR is restricted to the upper layers.

The "Handover Restriction List" IE is present in the "Initial Context Setup Request" message for Attach and TAU procedure with data forwarding procedure, in the "Handover Required" message for S1 handover procedure, in the "Downlink NAS Transport" message for TAU without active flag procedure.

Cisco® is one of the leading packet core vendors and has several customers worldwide who have deployed the Cisco® Packet Core solution for EPC. Cisco® enhanced its EPC packet core solution to support 5G non-standalone packet core capabilities. Cisco® will support 5G non-standalone features in its existing EPC packet core network functions so that operators, with Cisco® EPC Packet Core solution, can just do a software upgrade and buy 5G non-standalone licenses to turn on the 5G non-standalone capabilities.

The Cisco® 4G Control and User Plane Separation (CUPS) solution will provide flexibility and benefits of control- and user-plane separation and support for 5G peak data rates on a per-session basis.

The Cisco® 5G NSA Packet Core solution supports feature parity for both 4G and 5G sessions, so operators can have all the value-add features available for 4G sessions to be available for 5G sessions too. Cisco® EPC Packet Core network functions are available on the Cisco® Ultra Services Platform and are already deployed on several customers' networks worldwide. EPC network functions will eventually be available on the new Cisco® Cloud Native Ultra Services Platform including all 5G functions as well.

FIGS. 4A and 4B illustrate example approaches for implementing a 5G standalone packet core network. An example of an implementation of the 5G standalone packet core network is the Cisco® Ultra 5G SA Packet Core solution. The 5G standalone packet core is equipped with several new capabilities inherently built in so that operators have flexibility and capability to face new challenges with the new set of requirements for varying new use cases. The network functions in the new 5G core are broken down into smaller entities such as the Single-Mode Fiber (SMF) and UPF, which can be used on a per-service basis. Gone are the days of huge network boxes; welcome to services that automatically register and configure themselves over the service-based architecture, which is built with the new functions such as the Network Repository Function (NRF), which borrow their capabilities from cloud native technologies.

Separation of the user plane has freed it from the shackles of the control plane state and permits deployments at the edge with very little integration overhead. Multi-access edge computing that spans both wireless and wireline technologies will significantly redefine how users connect to applications, corporate networks, and each other.

Figure 5A:
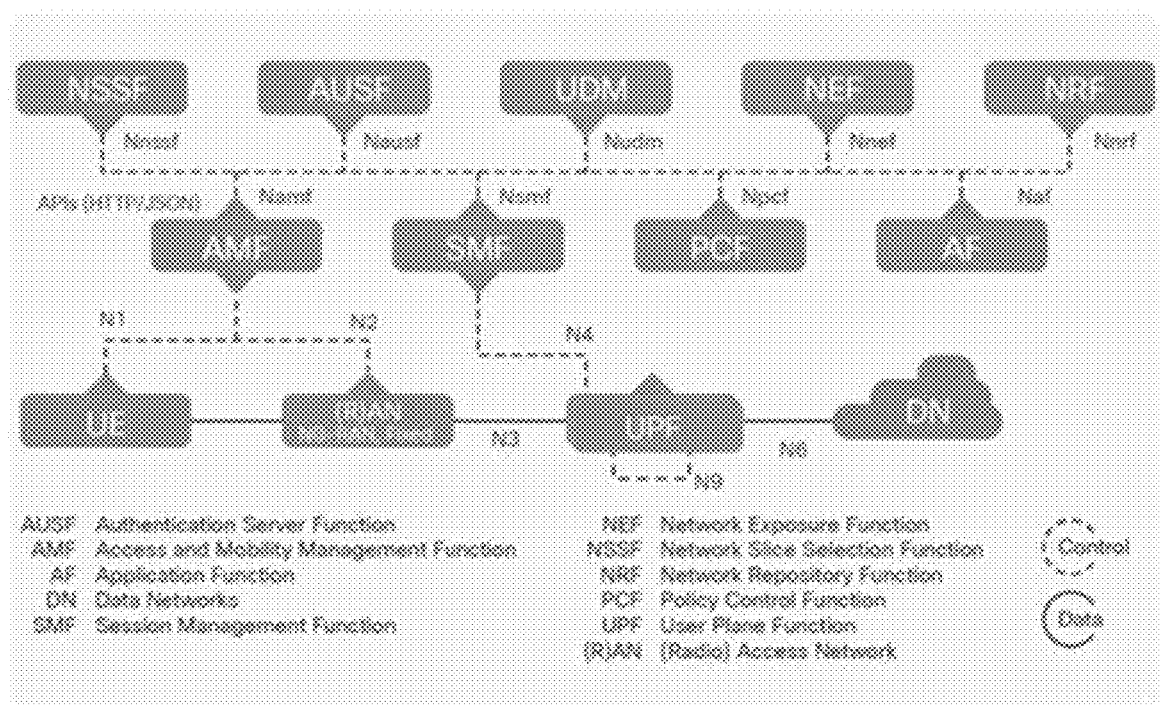
FIGS. 5A and 5B illustrate example approaches for implementing a 5G standalone packet core network, in accordance with some embodiments.

FIG. 5A illustrates an example of an architecture of the 5G standalone packet core network as defined by 3GPP.

The Cisco® Ultra Services Platform has evolved into a cloud-native platform. With this evolved cloud-native platform, the Cisco® 5G Stand-Alone (SA) solution provides a synergistic and coherent set of 5G SA network functions compliant to 5G SA 3GPP standards. These functions help Cisco® enable best-in-class—cloud operational benefits across the full Cisco 5G network-function portfolio. These cloud operational benefits include dynamic network-function scale-in/-out, faster network-function upgrades, in-service network-function upgrades, and support for NETCONF/YANG and streaming telemetry. Cisco®'s goal is to provide a modular network-function implementation that enables carrier-specific adaptations to implement differentiated services. Cisco®'s 5G Packet Core portfolio strategy is that all our 5G network-functions will use these common base software platform characteristics. This scenario enables our 5G core solution so customers can enjoy the related cloud operations benefits across the range of relevant Cisco network functions, consolidating and streamlining the network-function management and operational processes, and reducing carrier Operating Expenses (OpEx).

Cisco®'s Cloud Native Ultra Services Platform delivers common configuration tools, common telemetry, logging, a unified control plane, common HTTP2/Stream Control Transmission Protocol (SCTP), Smart Business Architecture (SBA)/Representational State Transfer (REST)/JavaScript Object Notation (JSON), common database technologies, high-availability and Geographical Redundancy (GR) services, and common orchestration across all our 5G standalone network functions. This Cisco® Cloud Native Ultra Services Platform uses open-source software services and tasks (e.g., IP Communicator (IPC), data synchronization, Service Bus, and configuration), life-cycle management (e.g., KUBERNETES, load balancer, service mesh, and continuous integration and continuous delivery support) enabling improved time to market and improved service velocity.

In addition to delivering 3GPP Release 15-compliant 5G network functions, Cisco®'s 5G solution strategy is to deliver an operationally efficient, unified, and high-performance 5G service-based architecture across these 5G network functions, with value-added Cisco® capabilities beyond 3GPP.

Finally, Cisco®'s 5G solution strategy is also to use our significant 4G software features across our 4G EPC products to provide maximum 4G and 5G feature compatibility where possible in our 5G network functions, and to enable feature-rich 4G and 5G network interworking capabilities in these network functions.

Figure 5B:
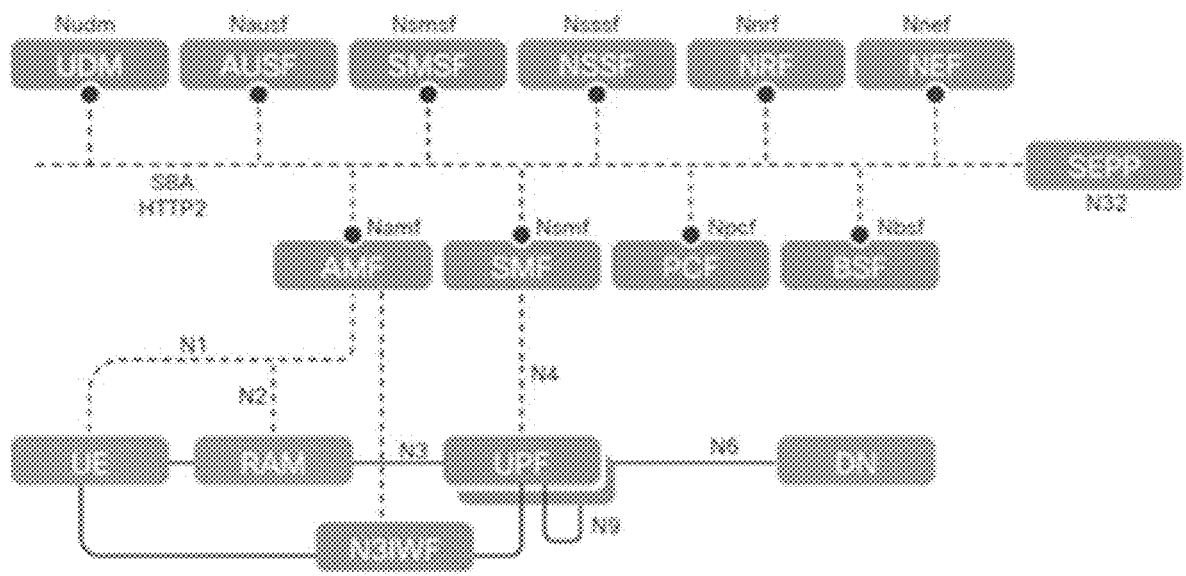

FIG. 5B illustrates an example of an implementation of a 5G standalone packet core network. The standalone packet core network can include an Access and Mobility management Function (AMF), Session Management Function (SMF), UPF, PCF, Network Repository Function (NRF), Network Slice Selection Function (NSSF), Network Exposure Function (NEF), Binding Support Function (BSF), Non-3GPP Interworking Function (N3IWF), and Security Edge Protection Proxy (SEPP).

AMF supports registration management, access control, and mobility management function for all 3GPP accesses as well as non-3GPP accesses such as Wireless LAN (WLAN). AMF also receives mobility-related policies from the PCF (for example, mobility restrictions) and forwards them to the user equipment. AMF fully supports 4G interoperability with the interface to 4G MME node.

SMF builds upon the evolutions of the industry-leading Cisco® System Architecture Evolution Gateway (SAE-GW) solution in the 4G space and its evolution in the 4G architecture to evolve to CUPS to support a decomposed SAEGW control plane (SAEGW-C) as the central control-plane entity that communicates over an Sx interface to the distributed and hybrid user-plane functions. Cisco® started on the journey toward CUPS and laid the groundwork for the SMF evolution ahead of the 3GPP standards. In addition to supporting the standards-based SAEGW-C and its evolution to SMF, the rich history and experience of delivering integrated inline services and how that can be enabled in various operator networks for the various use cases is the key differentiation of the Cisco® SMF product strategy. In the 5G architecture, SMF is responsible for session management with individual functions being supported on a per-session basis. SMF allocates IP addresses to user equipment, and selects and controls the UPF for data transfer. SMF also acts as the external point for all communication related to the various services offered and enabled in the user plane and how the policy and charging treatment for these services is applied and controlled.

The User Plane Function (UPF) is designed as a separate network functions virtualization (VNF) that provides a high-performance forwarding engine for user traffic. The UPF uses Cisco® Vector Packet Processing (VPP) technology for ultra-fast packet forwarding and retains compatibility with all the user-plane functions that the monolithic STAROS offers currently (such as Source/Dest Policy Incomplete [SPI/DPI] traffic optimization; and inline services Network Address Translation (NAT), firewall, Domain Name System (DNS) snooping etc.).

Cisco® UPF product evolution for 5G continues to build upon our core principles of delivering industry-leading performance while integrating intelligence in the data path to deliver differentiated services in truly distributed network architectures. The UPF product strategy encompasses a broad range of user planes that can run on existing physical assets (investment protection), on-premises Telco Cloud, and virtualized environments as well as truly cloud-native user planes that can support a mix of public and private cloud offerings. Supporting distributed architectures with user planes moving closer to the edge and supporting Mobility Edge Compute (MEC) use cases to support the data-path services, delivered closer to the edge and with really low latency, is an integral part of the 5G evolution. Cisco® UPF product strategy is based on incorporating intelligent inline services as well as a traffic steering framework to support service chains that can include external third-party applications as well. The key product capabilities of Cisco® UPF are Integrated DPI-based services, Cisco® Ultra Services Proxy, Cisco® Ultra Traffic Optimization (UTO), and others.

Cisco® DPI and inline services include Application Detection and Control (ADC), integrated subscriber firmware and NAT, and integrated content-filtering, among others. Cisco® ADC allows operators to dynamically detect applications run by subscribers and derive business intelligence about the traffic and apply packaged promotions such as zero rating of music, video, or social media applications. ADC employs heuristic, statistical, and deterministic analysis-based detection of applications and content. Cisco exploits co-development opportunities where possible with content providers and the operators to better identify applications (such as Google, Amazon, and Facebook) and realize use cases more accurately.

StarOS supports firewall and NAT inline services as part of the DPI function, thereby eliminating the need for an operator to deploy an external box that provides such functions. Inline services facilitate easier management and help reduce overall latency. The NAT implementation is carrier-grade endpoint-independent, and subscriber-aware and supports NAT44 and NAT64 functions. The firewall is an inline service that inspects subscriber traffic and performs IP session-based access control of individual subscriber sessions to protect the subscribers from malicious security attacks.

Integrated content-filtering extracts and categorizes Universal Resource Locators (URLs) contained in HTTP requests from mobile subscribers is available. The URLs are pre-categorized into classes by an external database. HTTP requests from user equipment are checked for URL categorization and policies are applied based on subscriber profile. Various actions are taken based on URL category and subscriber profile such as to permit, block, redirect, etc. The content-filtering solution is optimally applied at the SMF/UPF before unnecessary traffic propagates further into the network.

The USP integrates an inline services proxy for supporting optimization for end-user flows based on an integrated TCP/HTTP proxy that can be used to adapt to changing characteristics of a mobile connection and adjust the overall flow based on the service being offered. This proxy is based on integrating an industry-leading solution from a partner as an integrated offering and greatly simplifies the conventional way of offering such services, which incurred heavy overheads on how the traffic was steered and moved around in order to apply such services.

Mobile video tsunami is a reality now, and operators must make extensive RAN Capital Expenditures (CapEx) investments to keep up with mobile traffic growth. Operators are supporting the volume demand by increasing the number of cell sites in the RAN; otherwise the subscriber Quality of Experience (QoE) will suffer. The Cisco® Ultra Traffic Optimization (UTO) is a software solution on the 4G PGW or 5G UPF that allows the use of existing RAN much more efficiently, thereby delaying or reducing RAN investments. Cisco® UTO enables up to 40-percent more traffic transmission over a given band of spectrum and through existing cell sites and improves QoE for all subscribers and data flows.

Cisco® PCF is a direct evolution of the Cisco® PCRF on the existing Cisco® Policy Suite Cloud Native DOCKER container-based platform. The new PCF supports all the existing features of the traditional 3G and 4G Cisco® Policy Suite PCRF in addition to the new 5G QoS policy and charging control functions and the related 5G signaling interfaces defined for the 5G PCF by the 3GPP standards (e.g., N7, N15, N5, Rx, etc.). Through various configuration options, operators will have the flexibility to enable or disable various features, protocols, or interfaces. The PCF evolution is planned in an incremental manner to keep older Cisco® Policy Suite PCRF functions intact, and enable a hybrid 4G and 5G PCRF and PCF solution where necessary for customer operations.

Cisco® NRF is being delivered in line with 3GPP requirements in support of intelligent NFV core network node selection. Cisco®'s NRF product further delivers value-added intelligence in the areas of stateful node selection, serving node discovery, topology hiding, signaling proxying as a basis for advance 5G network automation, and superior 5G core overall flexibility and simplicity of operations. Cisco®'s 5G NRF product uses and extends key 4G product assets in the area of 4G node selection and 4G diameter signaling control.

Cisco®'s NEF uses the Cisco® 4G Application Programming Interface (API) gateway called mobile orchestration gateway, which is commercially deployed in cloud-native networks today. The Cisco® 4G API Gateway currently enables subscriber session QoS control services and sponsored data charging services between the core network and over-the-top applications, and as such lays the essential foundation for our 5G standalone NEF function in the 5G standalone core.

Network slicing enables the network to be segmented and managed for a specific use case or business scenario. A slice comprises the 5G network functions needed to compose a complete Public Land Mobile Network (PLMN). The operability of a slice can be exposed to a slice owner such as an enterprise delivering an IoT service. Examples of slices include fixed mobile wireless, connected car, as well as traditional consumer services. The network operator generally defines the granularity of a slice to best meet the business requirements.

Network slicing requires the ability to orchestrate and manage the 5G network functions as a common unit. This orchestration requires coordination across individual network functions to ensure services are properly configured and dimensioned to support the required use case.

NSSF provides a network slice instance selection function for user equipment. It is possible to determine whether to allow the network slice requested by the user equipment. It also is possible to select an appropriate AMF or candidate AMF set for the user equipment. Based on operator configuration, the NSSF can determine the NRF(s) to be used to select network functions and services within the selected network slice instance(s).

The 3GPP Binding Support Function (BSF) is a distinct 5G SA network function used for binding an application-function request to one of many PCF instances, as described in TS 23.503. The 3GPP BSF addresses a "PCF binding" problem (i.e., getting an application function and NEFs to talk to the same PCF as the SMF Protocol Data Unit (PDU) session) in 5G SA (independent of diameter), and it also fulfills a Diameter Routing Agent-like (DRA) binding function for 5G SA scenarios where the traditional IP Multimedia Subsystem (IMS) interacts with the 5G SA core through the Rx protocol. For the IMS use case, the BSF is defined to terminate (and convert) or proxy the Rx directly to the relevant PCF using binding-based routing at the BSF.

Also per 3GPP, the BSF can be co-located with other network functions such as SMF, PCF, NRF, etc., but most suitably co-located with the NEF.

As a 5G SA network-function type, the BSF per se does not apply to option 3x for which the EPC core applies, including traditional virtual DRA (vDRA) nodes that perform Rx and Gx binding-based routing in 4G. Being an extension of Cisco vDRA in 4G, the Cisco BSF can, however, operate in the option 3x core, but in this case the Cisco BSF would, of course, be configured as a DRA node.

Security Edge Protection Proxy (SEPP) is a nontransparent proxy that supports message filtering and policing on inter-PLMN control-plane interfaces and also topology hiding for the PLMN network. A SEPP function should perform the firewall role for transactions between domains. Given that the SEPP is the point where integrity protection and encryption are applied, the SEPP has visibility into each aspect of a transaction.

The SEPP function applies permit/deny Access Control Lists (ACLs) based on configured rules. This approach is effective for known threat exposures.

Furthermore, the SEPP function generates flow-related information that will be provided to an off-board threat visibility analysis function such as Cisco® Stealthwatch® security. This capability supports the creation of a baseline behavior profile, which allows the operator to validate the policies driving the ACL creation against observed behavior and correct as necessary. It also allows the operator to detect anomalous behaviors in real time and instigate manual remediation. For example, rogue nodes attempting to use SEPP services would be highlighted.

These flow records can also be used to assist resolving disputes between roaming partners, using Internetwork Packet Exchange (IPX)-like functions or directly connected.

Additionally, the SEPP firewall functions allow the presentation of optional security honeypot-like functions. Suspect flows, based on rogue node identification, would be processed by the function in such a way that potential attackers perceive no detectable change in behavior.

The non-3GPP interworking function (N3IWF) is used for integrating non-3GPP access types into the 5G SA core to make it a truly converged core. It is used mainly for non-3GPP access types such as Wi-Fi and fixed-line integration into the 5G SA core. The N3IWF terminates the Internet Key Exchange Version 2 (IKEv2) and IP Security (IPsec) protocols with the user equipment over NWu and relays over the N2 interface the information needed to authenticate the user equipment and authorize its access to the 5G core network. It also mainly supports termination of N2 and N3 interfaces to the 5G core network for the control and user planes, respectively.

Figure 6:
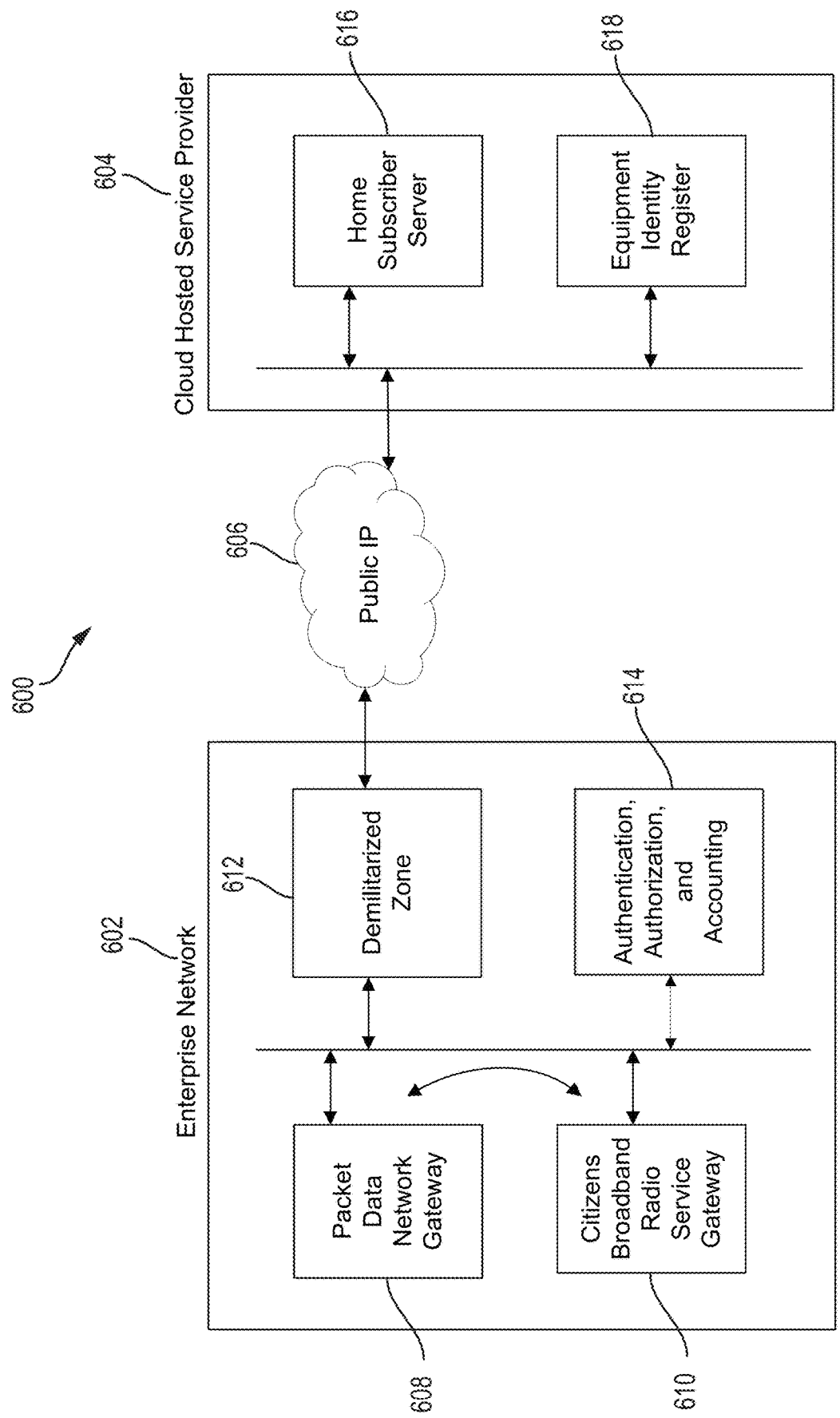
FIG. 6 illustrates an example topology for integrating Citizens Broadband Radio Service (CBRS) enabled devices into an enterprise network, in accordance with some embodiments.

FIG. 6 illustrates an example topology 600 for integrating Citizens Broadband Radio Service (CBRS) enabled devices into an enterprise network 602, in accordance with some embodiments. In some instances, the topology 600 can include the enterprise network 602, a cloud hosted service provider 604, and a public IP 606. In other instances, the enterprise network 602 can include a packet data network gateway 608, a CBRS gateway 610, a demilitarized zone (DMZ) 612, and authentication, authorization, and accounting (AAA) 614. The cloud hosted service provider 604 can include a home subscriber server 616 and an equipment identity register 618.

The enterprise networks 602 may impose security requirements before granting network access to CBRS-enabled devices. For example, the CBRS-enabled devices may require a secondary form of authentication prior to gaining network access. The CBRS-enabled devices can be authenticated using Subscriber Identity Modules (SIMs) or SIM cards including an international mobile subscriber identity (IMSI). The SIMs can be maintained by a third party, such as the cloud hosted service provider 604. However, the enterprise network 602 may prefer a secondary form of authentication that is maintained by the enterprise network 602. The enterprise network 602 may also prefer to "bind" the SIMs with particular devices for security purposes. For example, the SIM cards, unless they are embedded, can be removed and placed into a "phantom" device to circumvent certain subscriptions. As a result, there is a need to bind authentication credentials to designated CBRS-enabled devices.

In some instances, the enterprise networks 602 may be able to route traffic to a specific network segment based on a device profile. Network operators may want to be able to segment devices based on a combination of the type of the device (e.g., class of device) and the type of authentication. Other examples of types of devices include: 1) devices utilized by a user such as laptops, phones, tablets, and any other type of device utilized by a user that is suitable for the intended purpose and understood by a person of ordinary skill in the art; and 2) IoT-type devices such as sensors, wireless buttons, and any other IoT-type device suitable for the intended purpose and understood by a person of ordinary skill in the art.

Some CBRS-enabled devices may be routed to the DMZ 612, while other devices may be allowed directly into the enterprise network 602. The DMZ 612 may provide an extra layer of security by prohibiting/allowing access to the packet data network gateway 608 by way of the public IP 606.

In other instances, the enterprise network 602 may include an IMSI whitelist in the AAA server 614. In addition to SIM authentication, the enterprise network 602 can maintain the AAA server 614, which can contain the IMSIs of enterprise provisioned devices. After initial authentication, the packet data network gateway 608 can validate the IMSI of the CBRS-enabled device.

In some instances, a "key" may be stored in the SIM card of the CBRS-enabled device to provide further authentication by the enterprise network 602. In other instances, the "key" may include an IMSI, a password, a certificate, or any other key suitable for the intended purpose and understood by a person of ordinary skill in the art.

The CBRS-enabled device may also include SIM-based authentication software to provide a secondary form of authentication. An example of the SIM-based authentication software includes 3GPP SIM-based authentication software.

Authentication information may also be provided by the CBRS-enabled device via the cloud hosted service provider 604 such as the SIM card information, the IMSI, the "key," the SIM-based authentication software, or any other type of authentication suitable for the intended purpose and understood by a person of ordinary skill in the art. Moreover, information from the home subscriber server 616 and the equipment identity register 618 relating to the CBRS-enabled device may be provided to the enterprise network 602 to further authenticate the CBRS-enabled device.

In other instances, an international mobile equipment identity (IMEI) may further be utilized to authenticate the CBRS-enabled device. For example, IMSI to IMEI mapping can be utilized for pluggable SIMs. In some instances, the cloud hosted service provider 604 can maintain a mapping between the IMSI and the IMEI of a corresponding device. The home subscriber server 616 may include the IMSI, while the equipment identity register 618 may include the IMEI. The IMSI-IMEI mapping can also be managed by the enterprise network 602, which may ensure a proper binding between the CBRS-enabled device and the corresponding SIM.

After authentication, the mobile core can request the IMEI. The mobile core can further determine whether the IMEI maps to the corresponding IMSI. For example, the mobile core can include functional elements such as a Mobility Management Entity (MME), a Serving Gateway ("S-GW"), and a Packet Data Network (PDN) Gateway ("P-GW").

In some instances, virtual routing and forwarding (VRFs) can be assigned based on a device policy. A network administrator may design different VRFs to segment users (and their respective devices) or device types. For example, employees and contractors may be on a first set of VRFs, while laptops and IoT devices may be on another set of VRFs.

In other instances, the packet data network gateway 608 can include tunneling user traffic to specific VRFs. Assignment of the VRFs can further be based on the type and class of authentication of the CBRS-enabled device or any other type of authentication suitable for the intended purpose and understood by a person of ordinary skill in the art.

Figure 7:
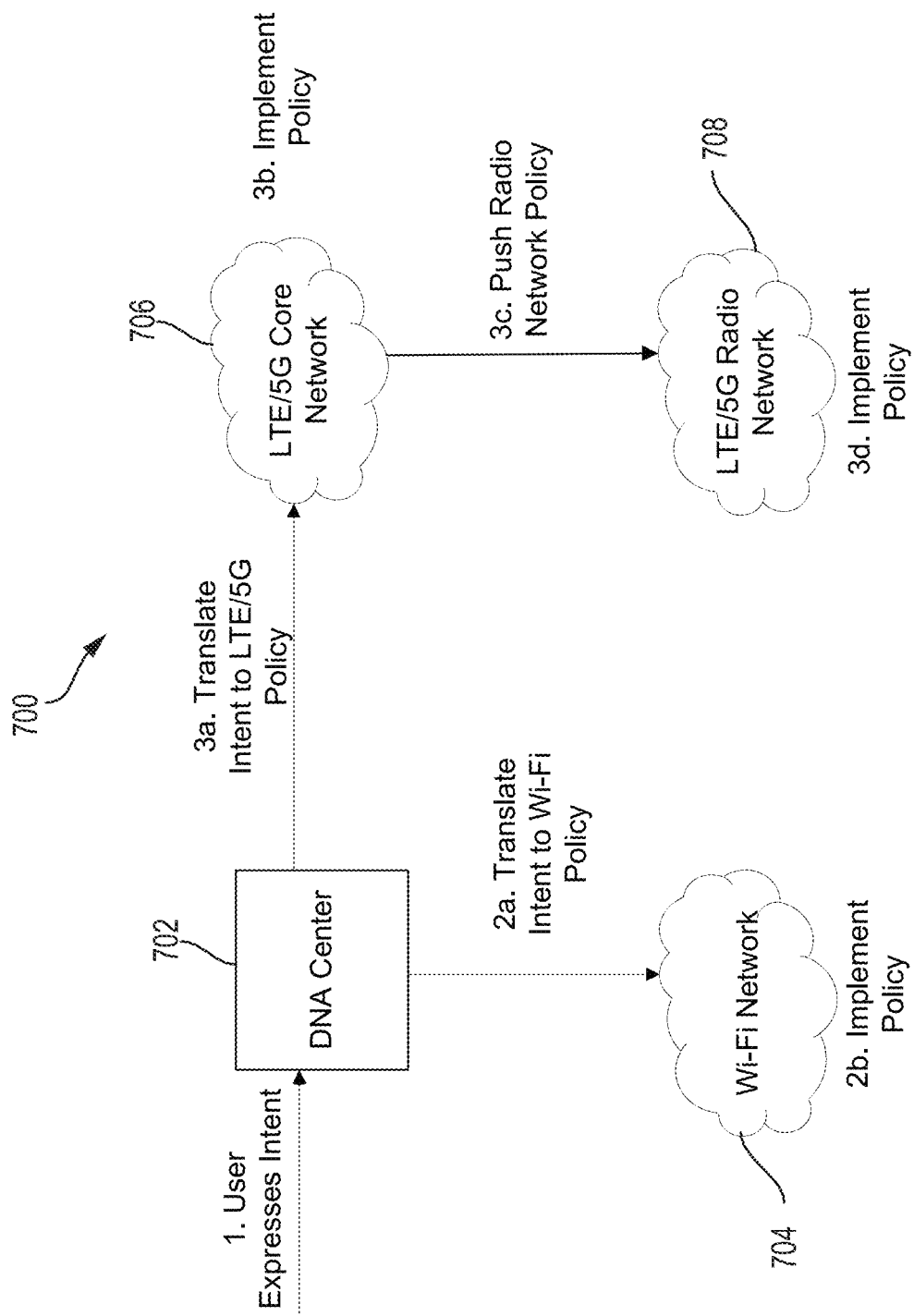
FIG. 7 illustrates an example of an operational diagram illustrating a system for translating intent into a network policy, in accordance with some embodiments.

FIG. 7 illustrates an example of an operational diagram illustrating a system for translating intent into a network policy 700, in accordance with some embodiments. In some instances, the system 700 can utilize a DNA Center 702, a Wi-Fi Network 704, an LTE/5G Core Network 706, and a LTE/5G Radio Network 708. The Core Network 706 and the Radio Network 708 may include LTE, 5G, 4G, and any other technology standard for cellular networks suitable for the intended purpose and understood by a person of ordinary skill in the art.

At step 1, the system 700 can include a network controller 702 (e.g., the network controller appliances 104, the network controller 250, and the DNA Center 702) that can receive a high-level intent from a user regarding the operation of an enterprise network (e.g., the enterprise network 100, the heterogeneous wireless network 200, etc.). An example of a high-level intent can include providing the highest level of QoS to a device.

In some instances, the intent of the user can include policies for the Wi-Fi Network 704, the LTE/5G Core Network 706, the LTE/5G Radio Network, or any other network suitable for the intended purpose and understood by a person of ordinary skill in the art. An example of a policy can include not allowing a user to access certain websites (e.g., URLs).

At step 2a, the system 700 can include the network controller 702 translating the intent received from the user into access network-specific policies (e.g., Wi-Fi policies and LTE/5G policies). For example, the network controller 702 can distribute the access network-specific policies to the Wi-Fi Network 704 under the network controller's 702 administrative control. For example, the system 700 can include the network controller 702 translating the intent of the user relating to a Wi-Fi policy and distributing the Wi-Fi policy to the Wi-Fi Network 704 (e.g., the wireless network infrastructure equipment 108, the network controller 250, etc.).

In some instances, the system 700 can include the Wi-Fi Network 704 and the LTE/5G Core Network 706 implementing the translated policies received from the network controller 702 (e.g., the DNA Center 702). For example, at step 2b, the system 700 can include the Wi-Fi Network 704 implementing the Wi-Fi policy translated from the user intent received in step 2a of the system 700 (e.g., via the wireless access points 128, the wireless access points 230, etc.).

Regarding a cellular network, at step 3a, the system 700 can include the network controller 702 translating the intent of the user to a LTE/5G/4G policy and distributing the LTE/5G/4G core network policy to the LTE/5G/4G Core Network 706 (e.g., the wireless network infrastructure equipment 108, the network controller 250, etc.) under the network controller's 702 administrative control.

In some instances, at step 3b, the system 700 can include the LTE/5G/4G Core Network 706 implementing the LTE/5G/4G core network policies translated from the user intent received in step 3a of the system 700.

At step 3c, the system 700 can include the LTE/5G/4G Core Network 706 pushing LTE/5G/4G radio network policies based on the translated intent of step 3a of the system 700 to the LTE/5G Radio Network 708 (e.g., the wireless base stations 128, the CBSDs 210, the CBRS access points 212, etc.).

At step 3d, the system 700 can include the LTE/5G/4G Radio Network 708 implementing the LTE/5G/4G radio network policies pushed by the LTE/5G/4G Core Network 706 in step 3c of the system 700.

Figure 8:
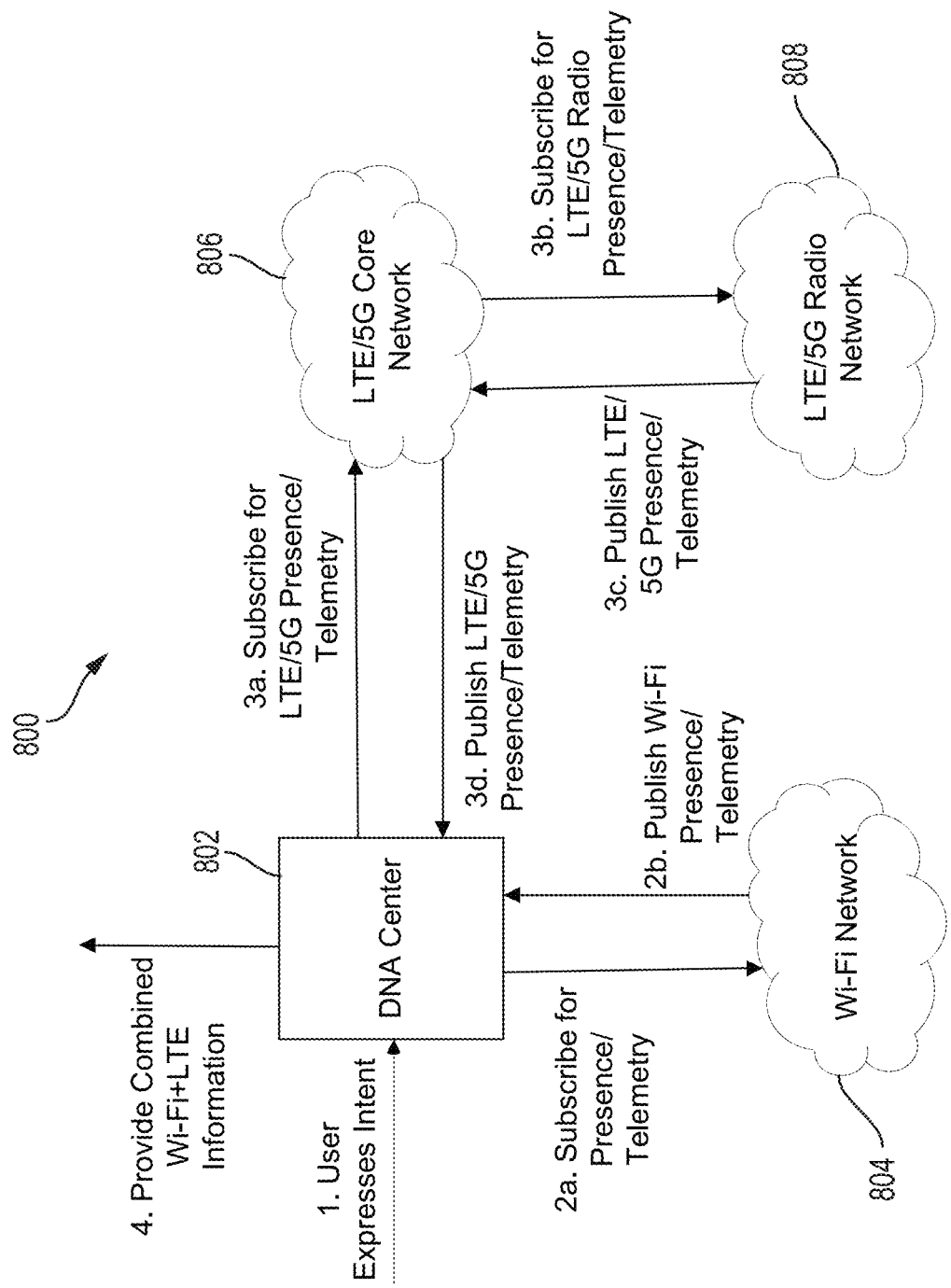
FIG. 8 illustrates an example of an operational diagram illustrating a system for publishing presence and telemetry information, in accordance with some embodiments.

FIG. 8 illustrates an example of an operational diagram illustrating a system for publishing presence and telemetry information 800, in accordance with some embodiments. In some instances, the system 800 can utilize a DNA Center 802, a Wi-Fi Network 804, an LTE/5G Core Network 806, and a LTE/5G Radio Network 808.

At step 1, the system 800 can include a network controller 802 (e.g., the network controller appliances 104, the network controller 250, and the DNA Center 802) receiving a high-level intent from a user regarding the operation of multiple access networks of an enterprise network (e.g., the enterprise network 100, the heterogeneous wireless network 200, etc.).

In some instances, the system 800 can include the network controller 802 subscribing to wireless networks (e.g., the Wi-Fi Network 804, the LTE/5G Core Network 806, and the LTE/5G Radio Network 808) for presence and telemetry information. For example, presence information can indicate whether the device is active or not. Presence information can also include an indication of the location of the device. Examples of telemetry information can include the number of bytes consumed by the device and types of applications running on the device.

At step 2a, the system 800 can include the network controller 802 subscribing to the Wi-Fi Network 804 (e.g., via the wireless network infrastructure equipment 108, the network controller 250, etc.) to receive presence and telemetry information regarding the Wi-Fi Network 804.

In other instances, the system 800 can include the network controller 802 receiving the presence and telemetry information from the wireless networks. For example, at step 2b, the system 800 can include the Wi-Fi Network 804 publishing the presence and telemetry information regarding the Wi-Fi Network 804 to the network controller 802.

Regarding a cellular network, at step 3a, the system 800 can include the network controller 802 subscribing to the LTE/5G Core Network 806 (e.g., via the wireless network infrastructure equipment 108, the network controller 250, etc.) to receive presence and telemetry information regarding the LTE/5G/4G Core Network 806 and/or the LTE/5G Radio Network 808. Furthermore, at step 3b, the system 800 can include the LTE/5G/4G Core Network 806 subscribing to the LTE/5G/4G Radio Network 808 (e.g., via the wireless base stations 128, the CBSDs 210, the CBRS access points 212, etc.) to receive presence and telemetry information from the LTE/5G/4G Radio Network 808.

In some instances, at steps 3c and 3d, the system 800 can include the LTE/5G/4G Core Network 806 publishing the LTE/5G/4G Core Network 806 presence and telemetry information and/or the LTE/5G/4G Radio Network 808 presence and telemetry information received from the LTE/5G/4G Radio Network 808 to the network controller 802.

In other instances, at step 4, the system 800 can include the network controller 802 providing a combined view of the presence and telemetry information published by the Wi-Fi Network 804, the LTE/5G/4G Core Network 806, and/or the LTE/5G/4G Radio Network 808 as provided in steps 2b, 3c, and 3d of the system 800. The combined view of the presence and telemetry information can include a graph, table, presentation, comparison, charts, or any other view suitable for the intended purpose and understood by a person of ordinary skill in the art. In some instances, the combined view of the presence and telemetry information can include information relating to a device, CBRS, and Wi-Fi. For example, the combined view of the presence and telemetry information can provide a timeline indicating when (e.g., which time) the device was on Wi-Fi and when the device was on CBRS. The combined view of the presence and telemetry information can also provide information relating to how much traffic was sent over Wi-Fi and CBRS.

Figure 9:
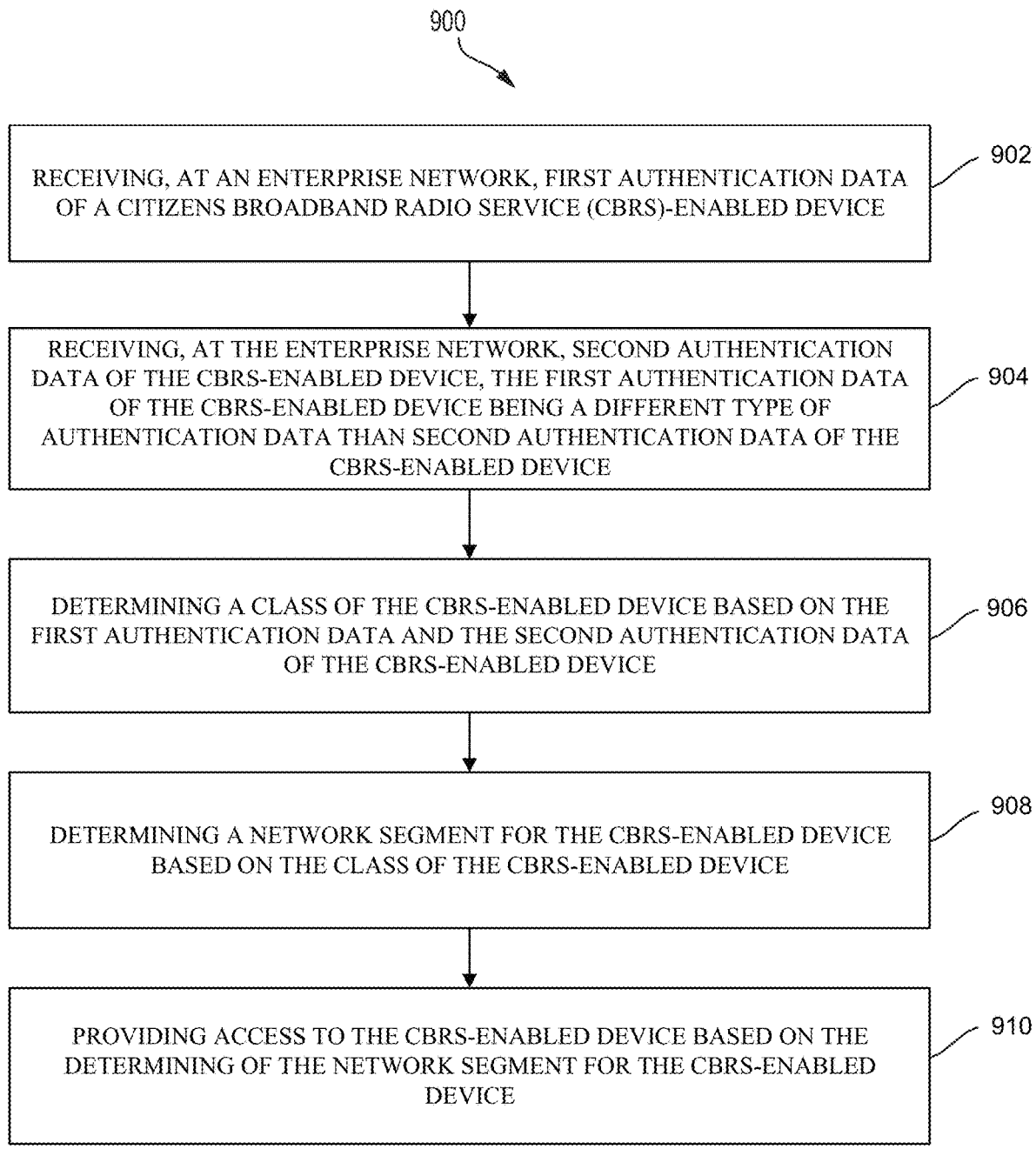
FIG. 9 illustrates an example process for integrating a CBRS-enabled device into an enterprise network, in accordance with some embodiments.

Having disclosed some example system components and concepts, the disclosure now turns to FIG. 9, which illustrate example method 900 for integrating a CBRS-enabled device into an enterprise network. The steps outlined herein are exemplary and can be implemented in any combination thereof, including combinations that exclude, add, or modify certain steps.

At step 902, the method 900 can include receiving, at an enterprise network, first authentication data of a citizens broadband radio service (CBRS)-enabled device. In some instances, the first authentication data of the CBRS-enabled device can include an international mobile subscriber identity (IMSI).

At step 904, the method 900 can include receiving, at the enterprise network, second authentication data of the CBRS-enabled device, the first authentication data of the CBRS-enabled device being a different type of authentication data than the second authentication data of the CBRS-enabled device. In some instances, the second authentication data of the CBRS-enabled device can include a key of a subscriber identity module (SIM) of the CBRS-enabled device or SIM-based authentication software of the CBRS-enabled device.

At step 906, the method 900 can include determining a class of the CBRS-enabled device based on the first authentication data and the second authentication data of the CBRS-enabled device.

At step 908, the method 900 can include determining a network segment for the CBRS-enabled device based on the class of the CBRS-enabled device.

At step 910, the method 900 can include providing access to the CBRS-enabled device based on the determining of the network segment for the CBRS-enabled device.

In some instances, the method 900 can further comprise assigning a virtual routing and forwarding (VRF) to the CBRS-enabled device based on the class of the CBRS-enabled device.

In other instances, the method 900 can further comprise receiving a user intent at the enterprise network relating to a Wi-Fi network or a cellular network.

In another instance, the method 900 can further comprise translating the user intent into a network policy.

In some instances, the method 900 can further comprise providing the network policy to the Wi-Fi network or the cellular network to be implemented by the Wi-Fi network or the cellular network.

Figure 10:
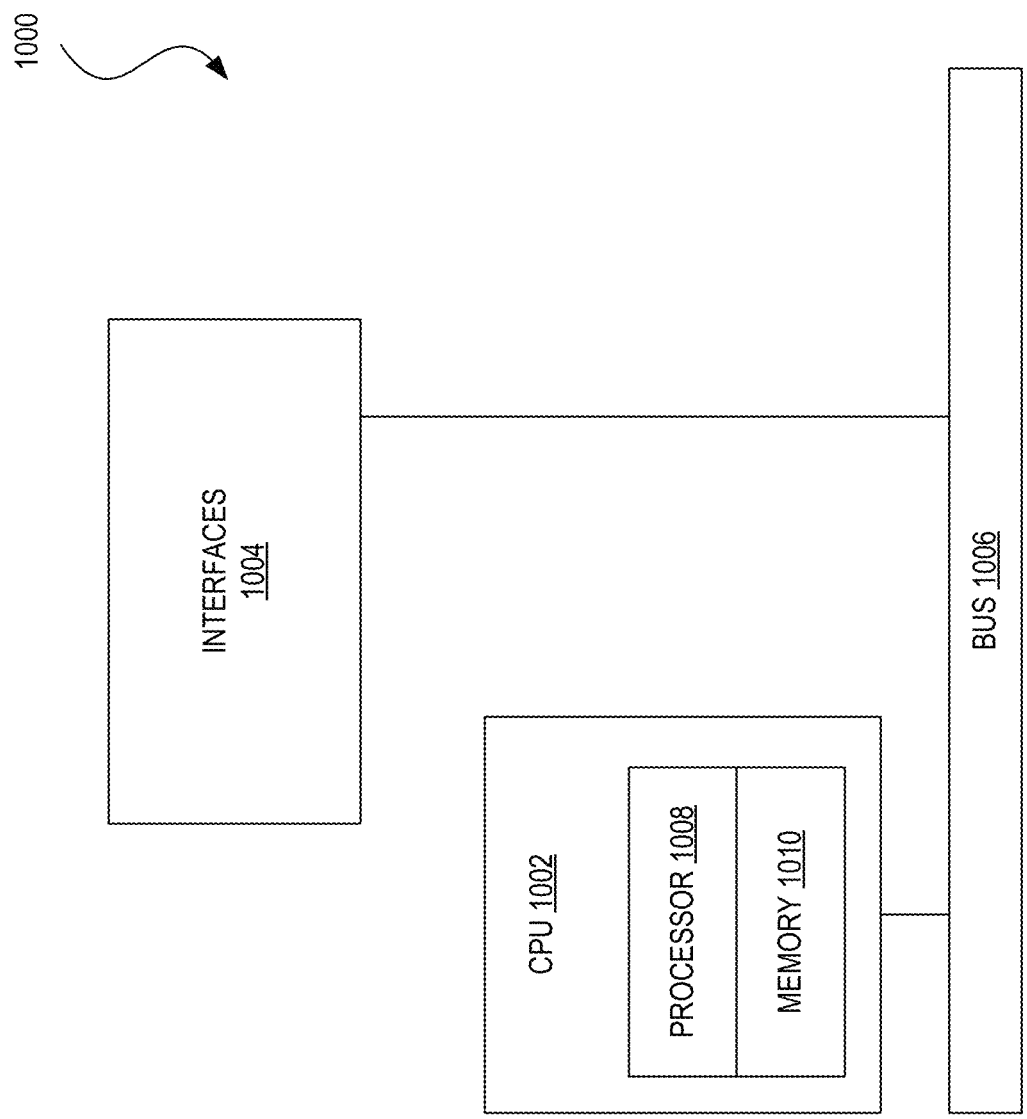
FIG. 10 illustrates an example of a network device, in accordance with some embodiments.

FIG. 10 further illustrates an example of a network device 1000 (e.g., switch, router, network appliance, etc.). The network device 1000 can include a master central processing unit (CPU) 1002, interfaces 1004, and a bus 1006 (e.g., a PCI bus). When acting under the control of appropriate software or firmware, the CPU 1002 can be responsible for executing packet management, error detection, and/or routing functions. The CPU 1002 preferably accomplishes all these functions under the control of software including an operating system and any appropriate applications software. The CPU 1002 may include one or more processors 1008 such as a processor from the Motorola family of microprocessors or the MIPS family of microprocessors. In an alternative embodiment, the processor 1008 can be specially designed hardware for controlling the operations of the network device 1000. In an embodiment, a memory 1010 (such as non-volatile RAM and/or ROM) can also form part of the CPU 1002. However, there are many different ways in which memory could be coupled to the system.

An enterprise network can address the above and other security requirements with certain enhancements. For example, the enterprise network can create an International Mobile Subscriber Identity (IMSI) whitelist in in an Authentication, Authorization, and Accounting (AAA) server. In addition to SIM authentication, the enterprise network can maintain the AAA server containing the IMSIs of enterprise-provisioned devices. After initial authentication, a Packet Data Network Gateway (PGW) can validate the IMSI with the local device. The enterprise can also create a mapping of IMSIs to International Mobile Equipment Identities (IMEIs) for (non-embedded) SIM cards. The cloud-hosted authentication system can maintain a mapping between IMSIs and IMEIs. This mapping can be controlled by the enterprise network. This can ensure a binding between device and SIM. After authentication, the mobile core can request the IMEI. It can further check if the IMEI maps to IMSI. The enterprise network can also deploy Virtual Routing and Forwarding (VRFs) instances based on device policy. The PGW can tunnel user traffic to specific VRFs.

The interfaces 1004 can be provided as interface cards (sometimes referred to as line cards). The interfaces 1004 can control the sending and receiving of data packets over the network and sometimes support other peripherals used with the network device 1000. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 1004 may include ports appropriate for communication with the appropriate media. In some cases, the interfaces 1004 may also include an independent processor and, in some instances, volatile RAM. The independent processors may control communication intensive tasks such as packet switching, media control, and management. By providing separate processors for the communication intensive tasks, the interfaces 1004 may allow the CPU 1002 to efficiently perform routing computations, network diagnostics, security functions, and so forth.

Although the system shown in FIG. 10 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 1000.

Regardless of the network device's configuration, it may employ one or more memories or memory modules (including the memory 1010) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 11A:
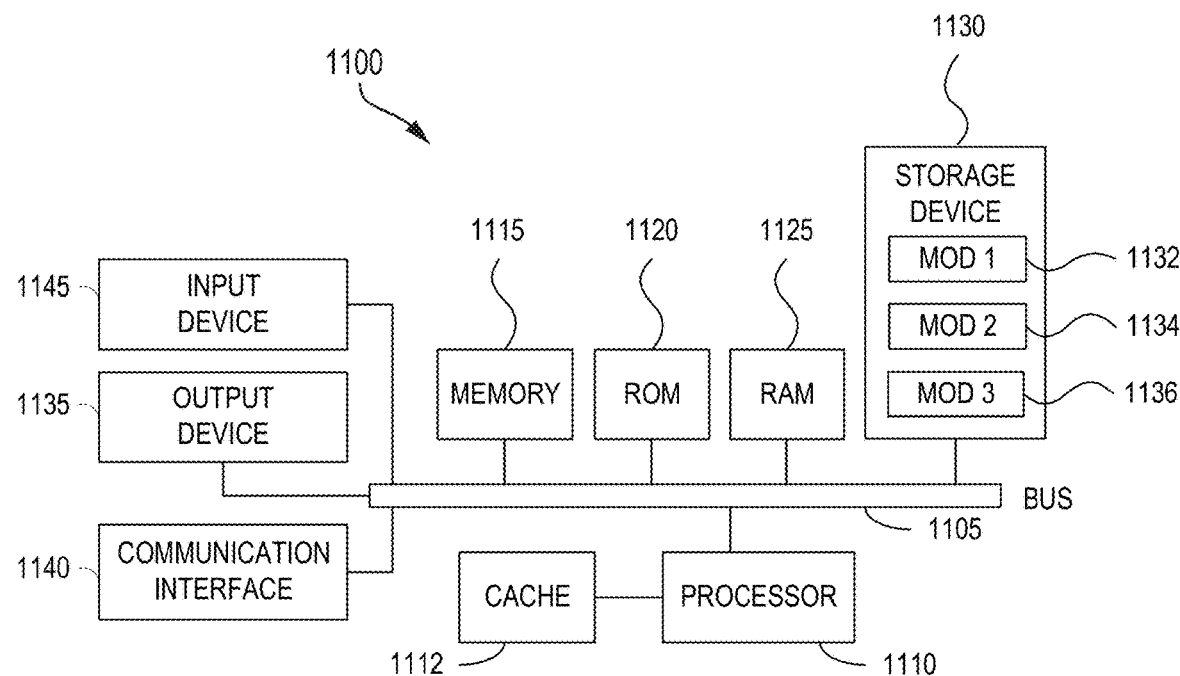
FIGS. 11A and 11B illustrate examples of systems, in accordance with some embodiments.
Figure 11B:
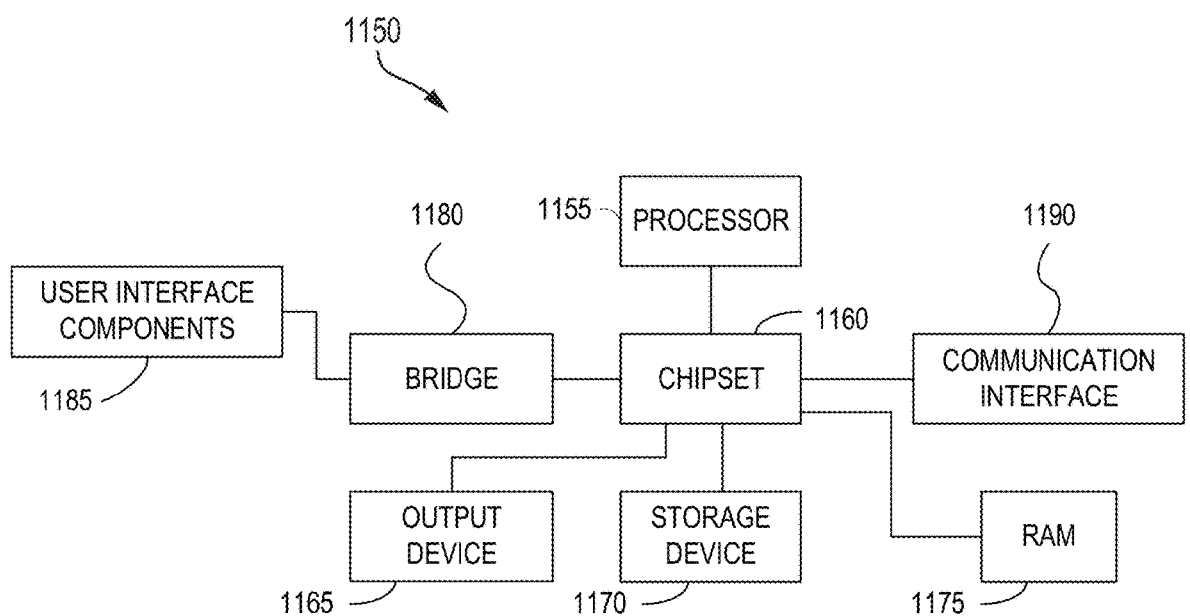

FIGS. 11A and 11B illustrate systems in accordance with various embodiments. The more appropriate system will be apparent to those of ordinary skill in the art when practicing the various embodiments. Persons of ordinary skill in the art will also readily appreciate that other systems are possible.

FIG. 11A illustrates an example of a bus computing system 1100 wherein the components of the system are in electrical communication with each other using a bus 1105. The computing system 1100 can include a processing unit (CPU or processor) 1110 and a system bus 1105 that may couple various system components including the system memory 1115, such as read only memory (ROM) 1120 and random access memory (RAM) 1125, to the processor 1110. The computing system 1100 can include a cache 1112 of high-speed memory connected directly with, in close proximity to, or integrated as part of the processor 1110. The computing system 1100 can copy data from the memory 1115, ROM 1120, RAM 1125, and/or storage device 1130 to the cache 1112 for quick access by the processor 1110. In this way, the cache 1112 can provide a performance boost that avoids processor delays while waiting for data. These and other modules can control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in the storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing system 1100, an input device 1145 can represent any number of input mechanisms, such as a microphone for speech, a touch-protected screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing system 1100. The communications interface 1140 can govern and manage the user input and system output. There may be no restriction on operating on any particular hardware arrangement and therefore the basic features here may easily be substituted for improved hardware or firmware arrangements as they are developed.

The storage device 1130 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1130 can include the software modules 1132, 1134, 1136 for controlling the processor 1110. Other hardware or software modules are contemplated. The storage device 1130 can be connected to the system bus 1105. In some embodiments, a hardware module that performs a particular function can include a software component stored in a computer-readable medium in connection with the necessary hardware components, such as the processor 1110, bus 1105, output device 1135, and so forth, to carry out the function.

FIG. 11B illustrates an example architecture for a chipset computing system 1150 that can be used in accordance with an embodiment. The computing system 1150 can include a processor 1155, representative of any number of physically and/or logically distinct resources capable of executing software, firmware, and hardware configured to perform identified computations. The processor 1155 can communicate with a chipset 1160 that can control input to and output from the processor 1155. In this example, the chipset 1160 can output information to an output device 1165, such as a display, and can read and write information to storage device 1170, which can include magnetic media, solid state media, and other suitable storage media. The chipset 1160 can also read data from and write data to RAM 1175. A bridge 1180 for interfacing with a variety of user interface components 1185 can be provided for interfacing with the chipset 1160. The user interface components 1185 can include a keyboard, a microphone, touch detection and processing circuitry, a pointing device, such as a mouse, and so on. Inputs to the computing system 1150 can come from any of a variety of sources, machine generated and/or human generated.

The chipset 1160 can also interface with one or more communication interfaces 1190 that can have different physical interfaces. The communication interfaces 1190 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 1155 analyzing data stored in the storage device 1170 or the RAM 1175. Further, the computing system 1150 can receive inputs from a user via the user interface components 1185 and execute appropriate functions, such as browsing functions by interpreting these inputs using the processor 1155.

It will be appreciated that computing systems 1100 and 1150 can have more than one processor 1110 and 1155, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving, at an enterprise network, first authentication data of a citizens broadband radio service (CBRS)-enabled device;
receiving, at the enterprise network, second authentication data of the CBRS-enabled device, the first authentication data of the CBRS-enabled device being a different type of authentication data than the second authentication data of the CBRS-enabled device;
determining a class of the CBRS-enabled device based on the first authentication data and the second authentication data of the CBRS-enabled device;
determining a network segment for the CBRS-enabled device based on the class of the CBRS-enabled device; and
providing access to the CBRS-enabled device based on the determining of the network segment for the CBRS-enabled device.

2. The computer-implemented method of claim 1, wherein the first authentication data of the CBRS-enabled device includes an international mobile subscriber identity (IMSI).

3. The computer-implemented method of claim 1, wherein the second authentication data of the CBRS-enabled device includes a key of a subscriber identity module (SIM) of the CBRS-enabled device or SIM-based authentication software of the CBRS-enabled device.

4. The computer-implemented method of claim 1, further comprising assigning a virtual routing and forwarding (VRF) to the CBRS-enabled device based on the class of the CBRS-enabled device.

5. The computer-implemented method of claim 1, further comprising receiving a user intent at the enterprise network relating to a Wi-Fi network or a cellular network.

6. The computer-implemented method of claim 5, further comprising translating the user intent into a network policy.

7. The computer-implemented method of claim 6, further comprising providing the network policy to the Wi-Fi network or the cellular network to be implemented by the Wi-Fi network or the cellular network.

8. A system comprising:
one or more processors; and
at least one computer-readable storage medium having stored therein instructions which, when executed by the one or more processors, cause the system to:
receive, at an enterprise network, first authentication data of a citizens broadband radio service (CBRS)-enabled device;
receive, at the enterprise network, second authentication data of the CBRS-enabled device, the first authentication data of the CBRS-enabled device being a different type of authentication data than the second authentication data of the CBRS-enabled device;
determine a class of the CBRS-enabled device based on the first authentication data and the second authentication data of the CBRS-enabled device;
determine a network segment for the CBRS-enabled device based on the class of the CBRS-enabled device; and
provide access to the CBRS-enabled device based on the determination of the network segment for the CBRS-enabled device.

9. The system of claim 8, wherein the first authentication data of the CBRS-enabled device includes an international mobile subscriber identity (IMSI).

10. The system of claim 8, wherein the second authentication data of the CBRS-enabled device includes a key of a subscriber identity module (SIM) of the CBRS-enabled device or SIM-based authentication software of the CBRS-enabled device.

11. The system of claim 8, wherein the instructions which, when executed by the one or more processors, cause the system to assign a virtual routing and forwarding (VRF) to the CBRS-enabled device based on the class of the CBRS-enabled device.

12. The system of claim 8, wherein the instructions which, when executed by the one or more processors, cause the system to receive a user intent at the enterprise network relating to a Wi-Fi network or a cellular network.

13. The system of claim 12, wherein the instructions which, when executed by the one or more processors, cause the system to translate the user intent into a network policy.

14. The system of claim 13, wherein the instructions which, when executed by the one or more processors, cause the system to provide the network policy to the Wi-Fi network or the cellular network to be implemented by the Wi-Fi network or the cellular network.

15. A non-transitory computer-readable storage medium comprising:
instructions stored on the non-transitory computer-readable storage medium, the instructions, when executed by one or more processors, cause the one or more processors to:
receive, at an enterprise network, first authentication data of a citizens broadband radio service (CBRS)-enabled device;
receive, at the enterprise network, second authentication data of the CBRS-enabled device, the first authentication data of the CBRS-enabled device being a different type of authentication data than the second authentication data of the CBRS-enabled device;
determine a class of the CBRS-enabled device based on the first authentication data and the second authentication data of the CBRS-enabled device;
determine a network segment for the CBRS-enabled device based on the class of the CBRS-enabled device; and
provide access to the CBRS-enabled device based on the determination of the network segment for the CBRS-enabled device.

16. The non-transitory computer-readable storage medium of claim 15, wherein the first authentication data of the CBRS-enabled device includes an international mobile subscriber identity (IMSI).

17. The non-transitory computer-readable storage medium of claim 15, wherein the second authentication data of the CBRS-enabled device includes a key of a subscriber identity module (SIM) of the CBRS-enabled device or SIM-based authentication software of the CBRS-enabled device.

18. The non-transitory computer-readable storage medium of claim 15, wherein the instructions, when executed by the one or more processors, cause the one or more processors to assign a virtual routing and forwarding (VRF) to the CBRS-enabled device based on the class of the CBRS-enabled device.

19. The non-transitory computer-readable storage medium of claim 15, wherein the instructions, when executed by the one or more processors, cause the one or more processors to:
   receive a user intent at the enterprise network relating to a Wi-Fi network or a cellular network; and
   translate the user intent into a network policy.

20. The non-transitory computer-readable storage medium of claim 19, wherein the instructions, when executed by the one or more processors, cause the one or more processors to provide the network policy to the Wi-Fi network or the cellular network to be implemented by the Wi-Fi network or the cellular network.

* * * * *